United States Patent
Sazawa

(10) Patent No.: US 9,935,889 B2
(45) Date of Patent: Apr. 3, 2018

(54) COMMUNICATION APPARATUS AND METHOD

(71) Applicant: FUJITSU LIMITED, Kawasaki-shi, Kanagawa (JP)

(72) Inventor: Shinichi Sazawa, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 153 days.

(21) Appl. No.: 15/189,766

(22) Filed: Jun. 22, 2016

(65) Prior Publication Data

US 2016/0301621 A1 Oct. 13, 2016

Related U.S. Application Data

(63) Continuation of application No. PCT/JP2014/050687, filed on Jan. 16, 2014.

(51) Int. Cl.
*H04L 1/18* (2006.01)
*H04L 12/875* (2013.01)
*H04L 12/815* (2013.01)
*H04L 12/813* (2013.01)
*H04L 12/851* (2013.01)
(Continued)

(52) U.S. Cl.
CPC ............ *H04L 47/56* (2013.01); *H04L 1/189* (2013.01); *H04L 1/1816* (2013.01); *H04L 43/0852* (2013.01); *H04L 43/16* (2013.01); *H04L 45/742* (2013.01); *H04L 47/20* (2013.01); *H04L 47/22* (2013.01); *H04L 47/24* (2013.01); *H04L 67/2842* (2013.01)

(58) Field of Classification Search
None
See application file for complete search history.

(56) References Cited

U.S. PATENT DOCUMENTS

| 2002/0010797 | A1 | 1/2002 | Moulton |
| 2009/0217091 | A1 | 8/2009 | Miyamoto et al. |
| 2012/0102246 | A1* | 4/2012 | Nakata .................. G06F 21/606 710/106 |

FOREIGN PATENT DOCUMENTS

| JP | 2002-91731 | 3/2002 |
| JP | 2003-524968 | 8/2003 |

(Continued)

OTHER PUBLICATIONS

Extended European Search Report dated Jan. 5, 2017 in corresponding European Patent Application No. 14879155.1.
(Continued)

*Primary Examiner* — Kibrom T Hailu
(74) *Attorney, Agent, or Firm* — Staas & Halsey LLP

(57) ABSTRACT

A communication apparatus includes a storing unit, a setting unit, a transmitting unit. The storing unit stores the number of transmissions of data to a destination of the data in association with an identifier that identifies the data. The setting unit sets, when the number of transmissions of target data that is data of a target of transmission to the destination reaches a threshold, as alternative data, a combination of the target data and a retaining request for requesting retaining of the target data. The alternative data is data to be transmitted to the destination as an alternative of the target data. The setting unit sets, after transmission of the retaining request, the identifier of the target data as the alternative data. The transmitting unit transmits the alternative data to the destination.

10 Claims, 14 Drawing Sheets

(51) Int. Cl.
*H04L 12/26* (2006.01)
*H04L 12/747* (2013.01)
*H04L 29/08* (2006.01)

(56) References Cited

FOREIGN PATENT DOCUMENTS

| | | |
|---|---|---|
| JP | 2009-187393 | 8/2009 |
| JP | 2009-205201 | 9/2009 |
| JP | 2012-79044 | 4/2012 |
| WO | 01/61518 A1 | 8/2001 |

OTHER PUBLICATIONS

Ashok Anand, "Redundancy in Network Traffic: Findings and Implications", Proceedings of the eleventh international joint conference on measurement and modeling of computer systems (SIGMETRICS/Performance '09), ACM, 2009, pp. 37-48.
International Search Report dated Mar. 4, 2014 in corresponding International Application No. PCT/JP2014/050687.

\* cited by examiner

31a_1

| HASH VALUE | NUMBER OF TRANSMISSIONS | INDEX |
|---|---|---|
| HASH1 | 1 | |
| HASH2 | 1 | |
| HASH3 | 1 | |
| HASH4 | 1 | |
| HASH5 | 1 | |
| HASH6 | 1 | |

31a_2

| HASH VALUE | NUMBER OF TRANSMISSIONS | INDEX |
|---|---|---|
| HASH1 | 2 | 0 |
| HASH2 | 2 | 1000 |
| HASH3 | 2 | 2200 |
| HASH4 | 2 | 3000 |
| HASH5 | 2 | 4500 |
| HASH6 | 1 | |
| HASH7 | 1 | |
| HASH8 | 1 | |

F I G. 6

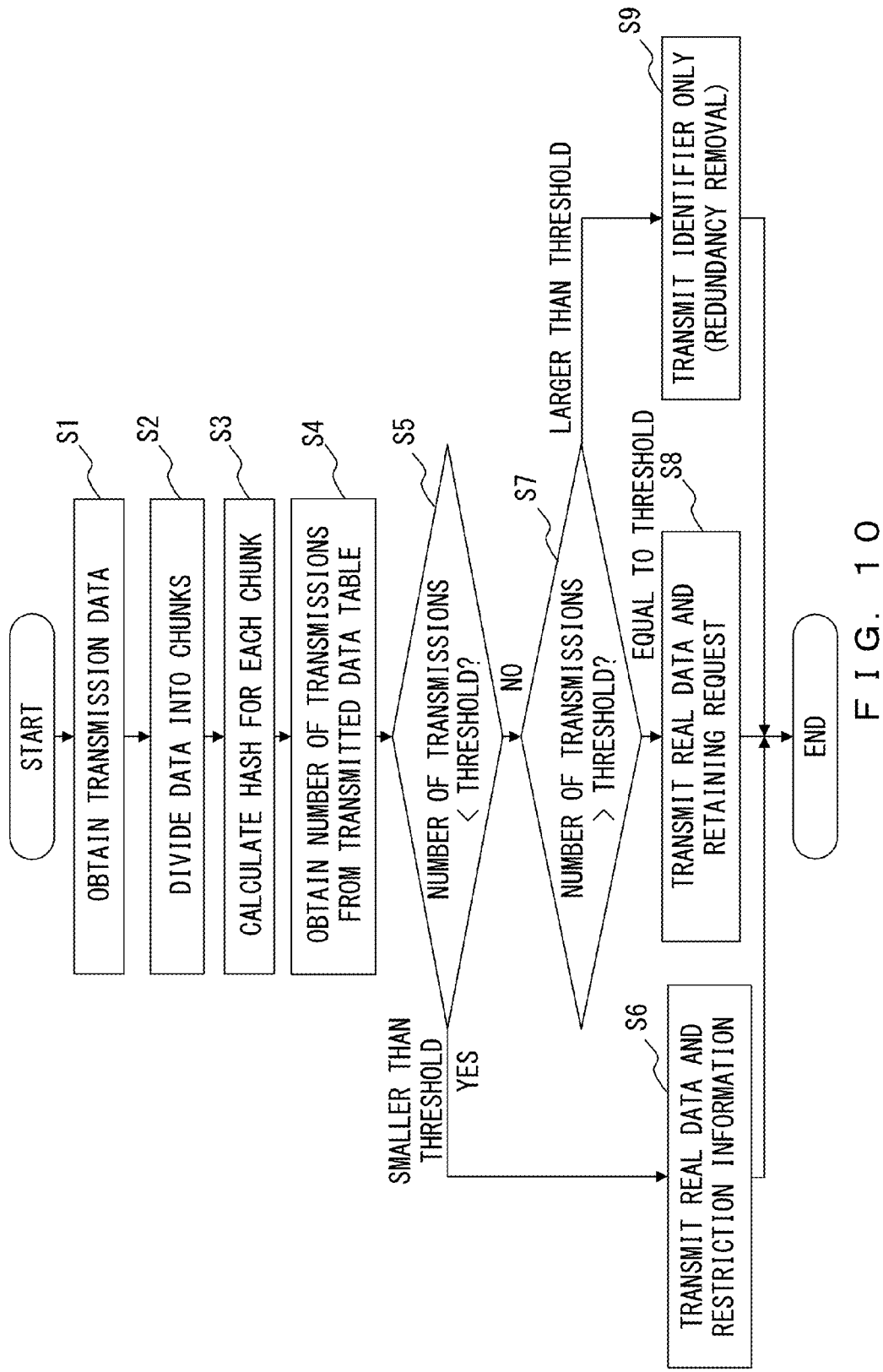
F I G. 10

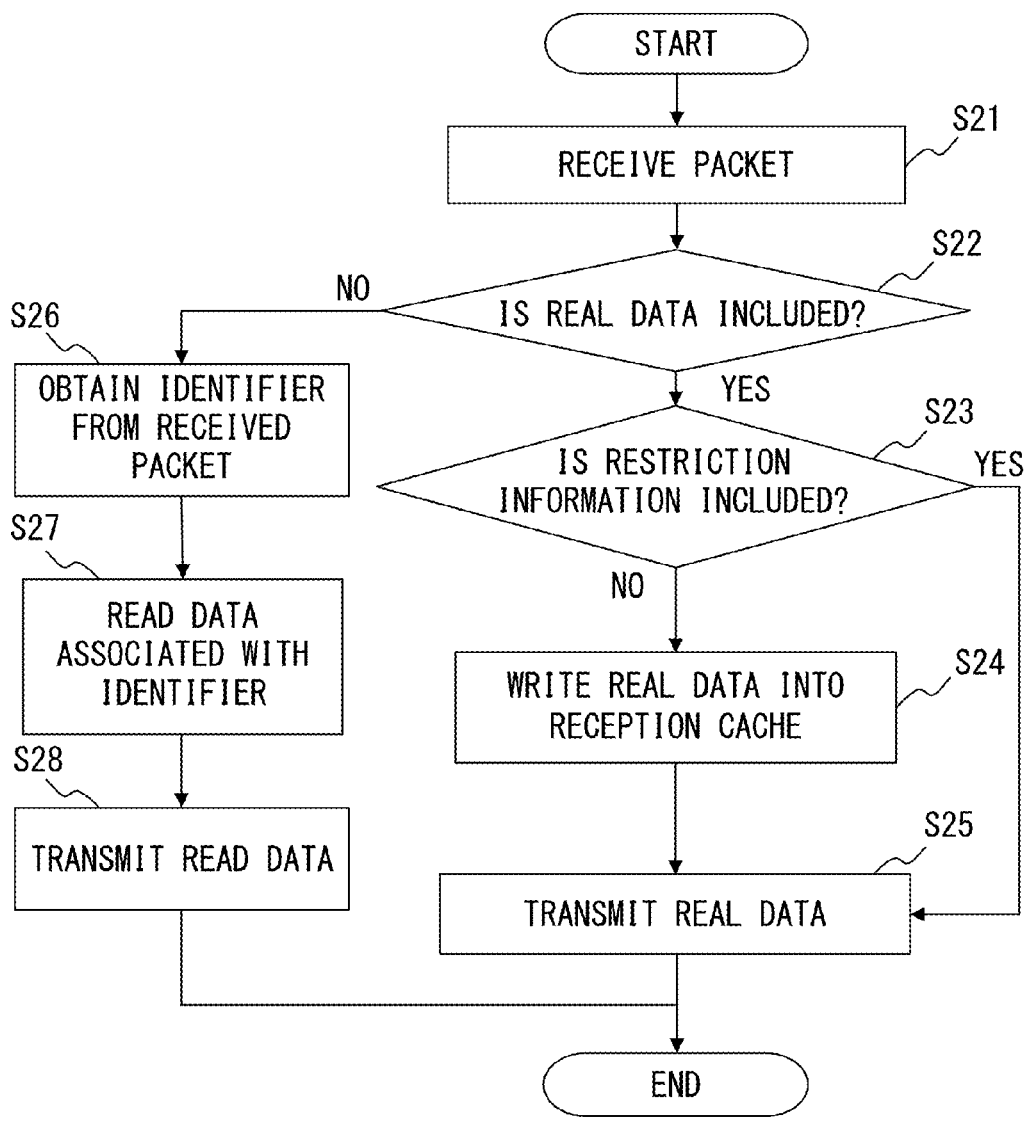
F I G. 1 1

COMMUNICATION APPARATUS AND METHOD

CROSS-REFERENCE TO RELATED APPLICATIONS

This application is a continuation application of International Application No. PCT/JP2014/050687 filed on Jan. 16, 2014, and designated the U.S., the entire contents of which are incorporated herein by reference.

FIELD

The embodiments discussed herein are related to communication performed between a plurality of communication apparatuses.

BACKGROUND

In recent years, speeding up of communication has been desired, and various attempts have been made in order to increase the communication speed. For example, in order to reduce data transmission volume, redundancy removal is performed for transmission target data in some cases. In redundancy removal, the communication apparatus of the receiving side associates and saves data received in the past from the communication apparatus of the transmitting side in a cache in association with identifiers, and the communication apparatus of the transmitting side also stores identifiers of data transmitted in the past. The communication apparatus of the transmitting side determines whether data that is about to be transmitted is data that has already been transmitted, using the identifier of the data, and for data that has already been transmitted, transmits the identifier associated with the data to the communication apparatus of the receiving side, instead of the data. The communication apparatus of the receiving side reads the data associated with the received identifier from the cache, and handles the read data as data transmitted from the communication apparatus of the transmitting side.

In relation to the processing of redundant data, a method have been known in which, in a case in which the same image data is processed, the printer driver forwards data to the printer with attachment of information indicating such matter, and the printer caches the image data.

When removing redundancy in transmitted data using a cache, the larger the size of the cache provided in the communication apparatus of the receiving side, the more data are stored in the cache, and therefore, it becomes easier to prevent transmission of redundant data. However, the capacity of the cache provided in the communication apparatus of the receiving side is limited, and when the available capacity in the cache runs out, the communication apparatus of the receiving side is to perform deletion starting from data with a longer elapsed time since the last access. For this reason, due to the deletion of data at the receiving side, redundancy removal may not be efficiently performed in some cases. For example, even when data A is included a plurality of times in transmission target data, a large volume of data without redundancy may be transmitted between data A transmitted first and data A transmitted later. At this time, if the available capacity of the cache of the communication apparatus of the receiving side runs out before the transmission of the data A transmitted later and the data A is deleted at the communication apparatus of the receiving side, it follows that the communication apparatus of the transmitting side is to transmit the data A again to the communication apparatus of the receiving side.

RELATED ART DOCUMENT

Patent Document

[Patent document 1] Japanese Laid-open Patent Publication No. 2002-91731

SUMMARY

According to an aspect of the embodiment, a communication apparatus includes a storing unit, a setting unit, a transmitting unit. The storing unit stores the number of transmissions of data to a destination of the data in association with an identifier that identifies the data. The setting unit sets, when the number of transmissions of target data that is data of a target of transmission to the destination reaches a threshold, as alternative data, a combination of the target data and a retaining request for requesting retaining of the target data. The alternative data is data to be transmitted to the destination as an alternative of the target data. The setting unit sets, after transmission of the retaining request for the target data, the identifier of the target data as the alternative data. The transmitting unit transmits the alternative data to the destination.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a figure representing an example of a transmitted data table;

FIG. 10 is a flowchart explaining an example of processing of a communication apparatus that transmits data;

FIG. 11 is a flowchart explaining an example of processing of a communication apparatus that receives data;

DESCRIPTION OF EMBODIMENTS

Figure 1:
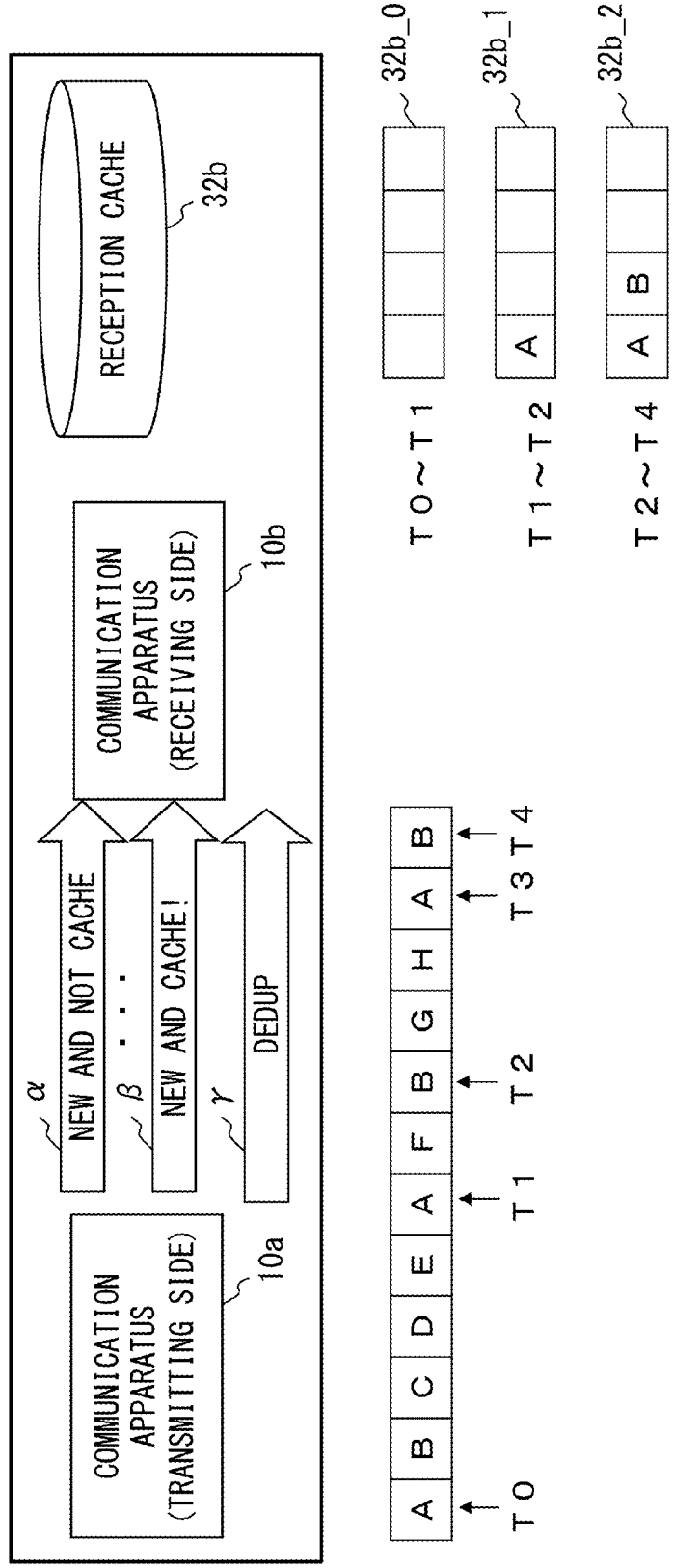
FIG. 1 is a figure explaining an example of communication according to an embodiment.

FIG. 1 represents an example of communication according to an embodiment. Hereinafter, the communication apparatus of the transmitting side is assumed as a communication apparatus 10a, and the communication apparatus of the receiving side is assumed as a communication apparatus 10b. Further, a reception cache provided in the communication apparatus 10b is assumed as a reception cache 32b.

When transmitting data to the communication apparatus 10b, the communication apparatus 10a generates an identifier with which it is possible to uniquely identify transmission target data. When transmitting transmission target data to the communication apparatus 10b, the communication apparatus 10a is supposed to store the number of transmissions of the data that have been made to the communication apparatus of the receiving side, in association with the identifier. In the example in FIG. 1, it is assumed that the communication between the communication apparatus 10a and the communication apparatus 10b has just started, and no transmission of data has been made from the communication apparatus 10a yet. The communication apparatus 10a stores a threshold N in advance, and while the number of transmissions of the same data is smaller than N, transmits data to the communication apparatus 10b information for restricting the retaining of data to be transmitted in the cache. Hereinafter, the information for restricting the retaining of data to be transmitted in the cache may be referred to as "restriction information". The communication apparatus 10b does not store data received with the restriction information in the reception cache 32b.

Meanwhile, when the number of transmissions of the same data becomes equal the threshold N, the communication apparatus 10a transmits data to the communication apparatus 10b with attachment of information for requesting the retaining of data to be transmitted in the cache. Hereinafter, the information for requesting the retaining of data to be transmitted in the cache may be referred to as a "retaining request". The communication apparatus 10b stores data received together with a retaining request in the reception cache 32b in association with the identifier of the data.

When the number of transmissions of the same data exceeds the threshold N, the communication apparatus 10a reports, instead of data to be transmitted, the identifier of the data to the communication apparatus 10b. The communication apparatus 10b reads data associated with the reported identifier from the reception cache 32b, and handles the read data as data received from the communication apparatus 10a.

For example, a case in which the communication apparatus 10a and the communication apparatus 10b start communication from a time T0 is explained as an example. Here, it is assumed that the threshold N is set to 2. At the point of the time T0, in order to transmit data A to the communication apparatus 10b, the communication apparatus 10a compares the number of transmissions of the data A to the communication apparatus 10b with the threshold N. At this point in time, the data A has not been transmitted to the communication apparatus 10b, and therefore, the current transmission is the first. The number of transmissions with the current transmission has not reached the threshold N, and therefore, the communication apparatus 10a transmits restriction information for the data A together with the data A to the communication apparatus 10b as indicated by an arrow α in FIG. 1. Then, the communication apparatus 10b receives the data A, but does not store the data A in the reception cache 32b. Accordingly, as presented in the reception cache 32b_0, the data is not stored in the reception cache 32b. After that, the communication apparatus 10a transmits data B, data C, data D, data E to the communication apparatus 10b together with the restriction information, in a similar manner as for the data A. Accordingly, the communication apparatus 10b does not store any of the data received from the communication apparatus 10a up to the reception of the data E.

Next, the communication apparatus 10a performs a process for transmitting the data A again to the communication apparatus 10b. The number of transmissions of the data A from the communication apparatus 10a to the communication apparatus 10b becomes 2 with the current transmission. The number of transmissions has become the same value as the threshold N, the communication apparatus 10a transmits, together with the data A, a retaining request for the data A to the communication apparatus 10b, as indicated by an arrow β in FIG. 1. Upon receiving the data A, the communication apparatus 10b stores it in the reception cache 32b. Accordingly, by the transmission process performed at a time T1, the communication apparatus 10b holds a reception cache 32b_1.

After that, the communication apparatus 10a transmits data F for the first time, and therefore, transmits the data F together with restriction information to the communication apparatus 10b. Then, the communication apparatus 10b does not store the data F, and therefore, the data retained in the reception cache 32b are not changed.

At a time T2, the communication apparatus 10a performs the second transmission process for data B addressed to the communication apparatus 10b. At this time, the number of transmissions of the data B becomes the same value as the threshold N, and therefore, as indicated by the arrow β in FIG. 1, the communication apparatus 10a transmits the data B and a retaining request of the data B to the communication apparatus 10b. The communication apparatus 10b stores the data B to the reception cache 32b, and therefore, by the transmission process performed at the time T2, the communication apparatus 10b updates the reception cache 32b_1 to a reception cache 32b_2.

After that, the communication apparatus 10a transmits data G, data H to the communication apparatus 10b together with restriction information. The communication apparatus 10b does not store the data G, data H, and therefore, the data retained in the reception cache 32b_2 are not changed.

At a time T3, the communication apparatus 10a makes an attempt to transmit the data A for the third time. At this time, the number of transmissions of the data A has exceeded the threshold N, and therefore, the communication apparatus 10a determines that the data A has already been stored in the communication apparatus 10b. Then, the communication apparatus 10a transmits the identifier of the data A to the communication apparatus 10b, as indicated by an arrow γ. Upon receiving the identifier of the data A, the communication apparatus 10b performs a search in the reception cache 32b_2 with the received identifier as the key, and obtains the data A. The communication apparatus 10b handles the obtained data A as transmitted data from the communication apparatus 10a.

At a time T4, the communication apparatus 10a performs the third transmission process for the data B. At this time, in a similar manner as in the transmission process for the data A at the time T3, the number of transmissions has exceeded the threshold N, and therefore, the communication apparatus 10a transmits the identifier of the data B to the communication apparatus 10b. The communication apparatus 10b performs a search in the reception cache 32b_2 with the identifier of the data B as the key, and obtains the data B. The communication apparatus 10b handles the obtained data B as transmitted data from the communication apparatus 10a.

As described above, in the method according to the embodiment, data transmitted a number of times that is equal to or more than the threshold is stored in the reception cache 32 provided in the communication apparatus 10 of the receiving side, but data whose number of transmissions is smaller than the threshold is not stored in the communication apparatus 10 of the receiving side. Accordingly, even when data that are transmitted a number of times that is smaller than the threshold are included in a volume equal to or more than the capacity of the reception cache 32 between data that are transmitted a number of times that is equal to or more than the threshold, it is still possible for the communication apparatus of the receiving side to store data that is transmitted in a redundant manner in the reception cache 32. In the example in FIG. 1, from the transmission of the data A at the time T1 to the transmission of the data A at the time T3, data other than the data A in a volume that is equivalent to the reception cache 32b are transmitted from the communication apparatus 10a to the communication apparatus 10b. However, the data transmitted between the time T1-T3 except the data B are transmitted a number of times that is equal to or smaller than the threshold and therefore do not become the target of the storing in the reception cache 32b. Accordingly, capacity shortage does not occur in the reception cache 32b, and when the data A is retransmitted at the time T3, the data A is retained in the reception cache 32b. Accordingly, redundancy removal is efficiently performed.

In the other words, by using the number of transmissions of data as an index of occurrence frequency of redundant manner, the communication apparatus 10 of the transmitting side according to the embodiment makes the communication apparatus 10 of the receiving side selectively store data that is relatively likely to be received in a redundant manner. Therefore, the communication apparatus 10 is able to efficiently prevent forwarding of data including a redundant portion.

<Example of Network and Configuration of Apparatus>

Figure 2:
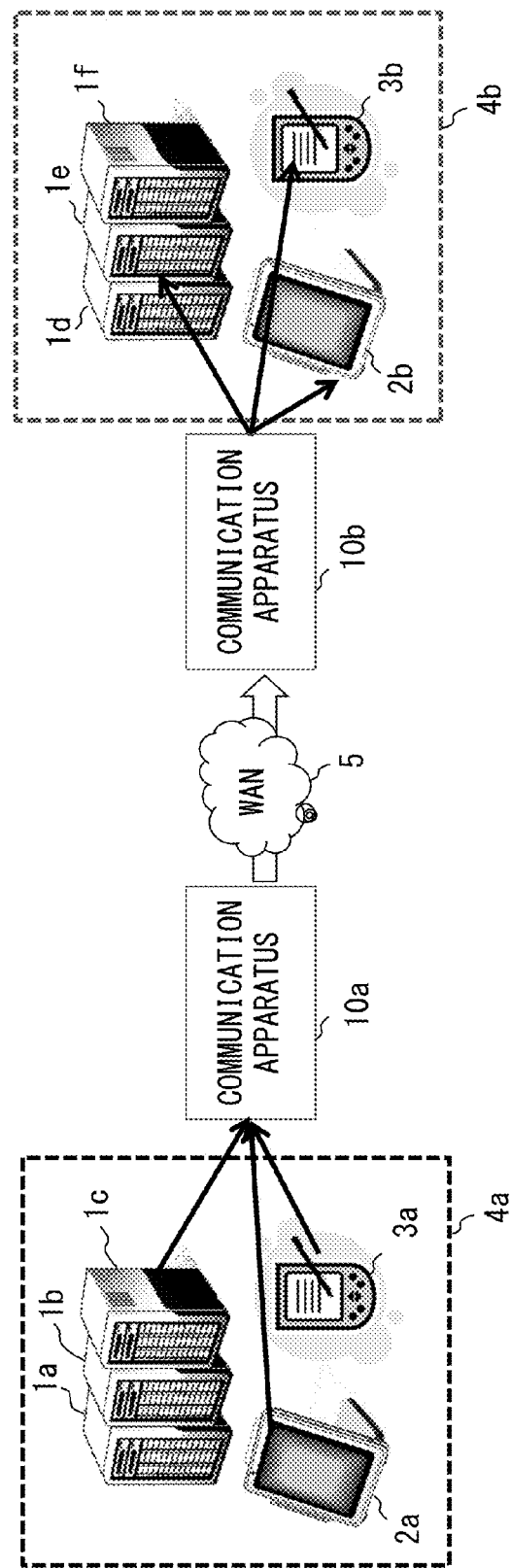
FIG. 2 represents an example of a network in which a communication apparatus according to an embodiment is used.

FIG. 2 is a figure representing an example of a network in which the communication apparatus 10 according to the embodiment is used. FIG. 2 represents an example of a network in a case in which apparatuses in an area 4a and apparatuses in an area 4b communicate across a Wide Area Network (WAN) 5. In the areas 4a, 4b, arbitrary kinds of apparatuses that perform communication are included in arbitrary quantities. The example in FIG. 2 represents a case in which servers 1a-1c, a tablet 2a, a mobile phone 3a are included in the area 4a, and servers 1d-1f, a tablet 2b, a mobile phone 3b are included in the area 4b. It is assumed that the apparatuses included in the area 4a access the WAN 5 via a communication apparatus 10a, and the apparatuses included in the area 4b access the WAN 5 via a communication apparatus 10b. Here, the communication apparatus 10a and the communication apparatus 10b are able to operate as a WAN speed-up apparatus. In the example in FIG. 2, the apparatuses included in the area 4a transmit data to the apparatuses included in the area 4b via the communication apparatus 10a and the communication apparatus 10b.

Figure 3:
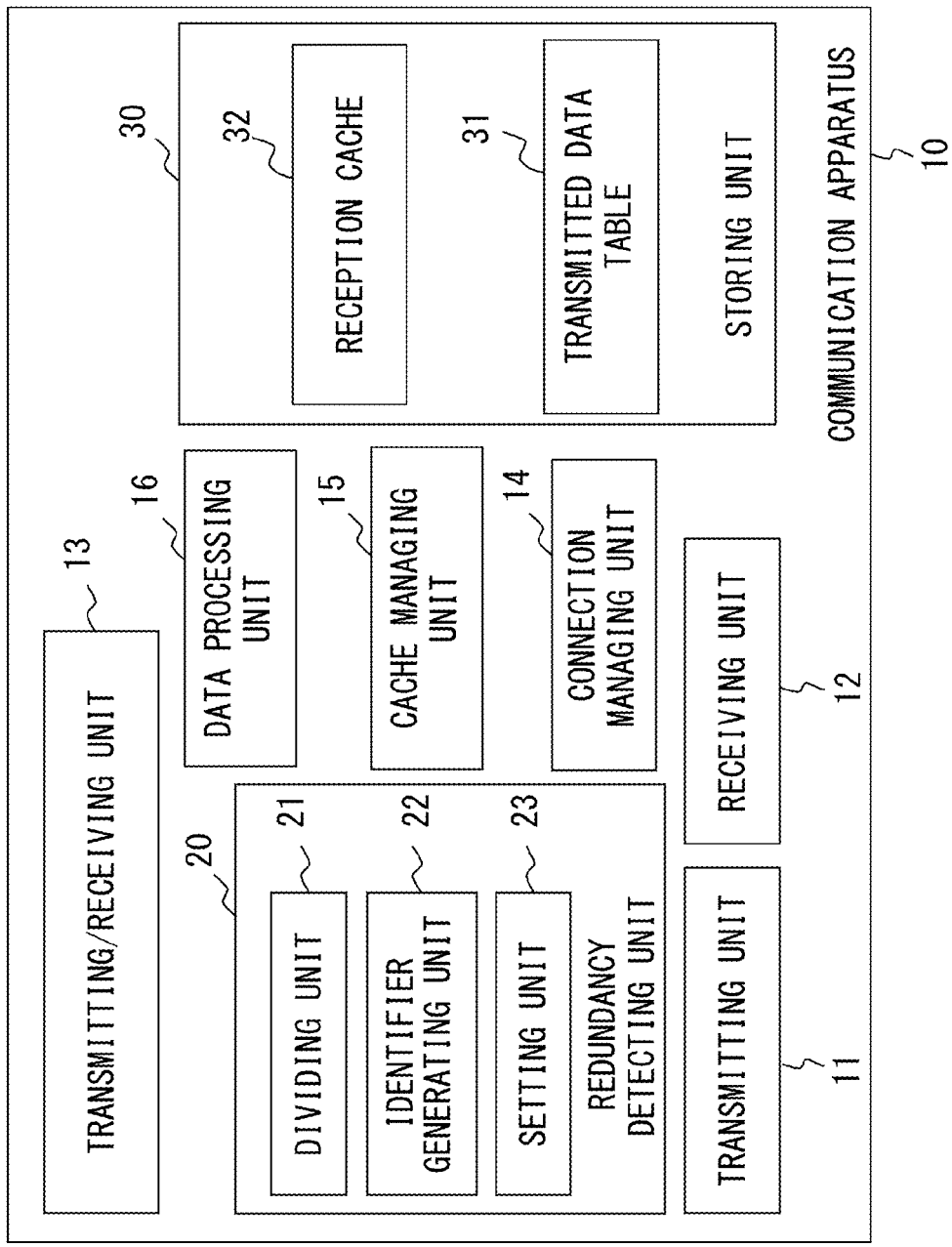
FIG. 3 is a figure representing an example of the configuration of a communication apparatus.

FIG. 3 represents an example of the configuration of the communication apparatus 10. The communication apparatus 10 includes a transmitting unit (transmitter) 11, a receiving unit (receiver) 12, a transmitting/receiving unit 13, a connection managing unit 14, a cache managing unit 15, a data processing unit 16, a redundancy detecting unit 20, a storing unit 30. The redundancy detecting unit 20 includes a dividing unit 21, an identifier generating unit 22, and a setting unit 23. The storing unit 30 includes a transmitted data table 31, a reception cache 32.

The transmitting unit 11 is used when the communication apparatus 10 transmits a packet to an apparatus included in the WAN 5, and another communication apparatus 10. The transmitting unit 11 transmits a packet input from the setting unit 23 or the like to the destination. The receiving unit 12 receives a packet from an apparatus included in the WAN 5, and another communication apparatus 10. The receiving unit 12 outputs the received packet to the cache managing unit 15. The transmitting/receiving unit 13 is used when the communication apparatus 10 performs transmission/reception of a packet with an apparatus that communicates with the communication apparatus 10 without the intervention of WAN 5. Here, the apparatus that communicates with the communication apparatus 10 without the intervention of WAN 5 is the server 1 or the like included in the area 4, that is able to communicate with the communication apparatus 10. The transmitting/receiving unit 13 outputs the packet received from an apparatus included in the area 4 to the data processing unit 16.

The connection managing unit 14 holds information related to the connection between the communication apparatuses 10 and to the connection status with apparatuses included in the area 4 with which the communication apparatus 10 is able to communicate. When a retaining request is included in a received packet, the cache managing unit 15 stores data obtained together with the retaining request in the reception cache 32, and further outputs the data in the received packet to the data processing unit 16. Meanwhile, when restriction information is included in a received packet, the cache managing unit 15 outputs data obtained together with the restriction information to the data processing unit 16, but does not store the data obtained together with the restriction information in the reception cache 32. When data in a packet input from the receiving unit 12 is an identifier that represents particular data, the cache managing unit 15 reads data associated with the identifier from the reception cache 32, and outputs the read data to the data processing unit 16. Meanwhile, when the received packet is a control packet that reports information of the reception cache 32 held by the communication apparatus 10 of the receiving side of data, the cache managing unit 15 outputs the input control packet to the setting unit 23.

The data processing unit 16 processes data obtained from the cache managing unit 15 as data sent from the communication apparatus 10 of the transmission source. When data obtained from the cache managing unit 15 is data addressed to the communication apparatus 10 itself, the data processing unit 16 processes the input data using an application or the like. Meanwhile, when the data input from the cache managing unit 15 is addressed to an apparatus included in the area 4 that is able to communicate with the communication apparatus 10, the data processing unit 16 performs a process for forwarding the data to the destination apparatus.

The redundancy detecting unit 20 operates in the communication apparatus 10 that transmits data to another communication apparatus 10. The dividing unit 21 generates data of a size that may be included in each individual transmission packet, by dividing a file or the like that is the target of transmission by a data length determined in advance. Hereinafter, data of a size that may be included in each individual transmission packet is referred to as a "chunk". The chunk is a block of data that becomes the target in determining whether there has been redundancy in data, or in identifying the number of transmissions. The dividing unit 21 outputs the generated chunks to the identifier generating unit 22. The identifier generating unit 22 generates an identifier for uniquely identifying each chunk. While method for generating the identifier may be any, for example, a hash function may be used for the generation of the identifier. The identifier generating unit 22 outputs the generated identifier to the setting unit 23.

The setting unit 23 performs a search in a transmitted data table 31 using the input identifier as the key. While an example of the transmitted data table 31 is presented later, the transmitted data table 31 associates the number of transmissions of the chunk to the communication apparatus 10 of the receiving side with the identifier that identifies the chunk. When the identifier used as the key is not included in the transmitted data table 31, the transmitted data table 31 records the processing target identifier in the transmitted data table 31 in association with information of the number of transmissions=1. Meanwhile, when the number of transmissions associated with the identifier is obtained from the transmitted data table 31, the setting unit 23 adds 1 to the obtained number and makes comparison with a threshold N. Here, the threshold N represents the number of transmissions of the processing target chunk to the communication apparatus 10 of the receiving side, including transmissions of a packet that has a retaining request. While the number of transmissions is smaller than the threshold N, the setting unit 23 includes the chunk and restriction information for the chunk in the transmission packet. On the other hand, when the number of transmissions becomes equal the threshold N, the setting unit 23 generates the transmission packet by including a retaining request in the processing target chunk. When the number of transmissions exceeds the threshold N, the setting unit 23 includes the identifier in the transmission packet and performs transmission to the communication apparatus 10 of the receiving side. Meanwhile, when the communication apparatus 10 of the receiving side reports the condition of the reception cache 32 of the receiving side to the communication apparatus of the transmitting side using an index value that indicates the area that holds each individual chunk, the setting unit 23 may use the index value as the identifier. An example of communication using the index value is described later.

Figure 4:
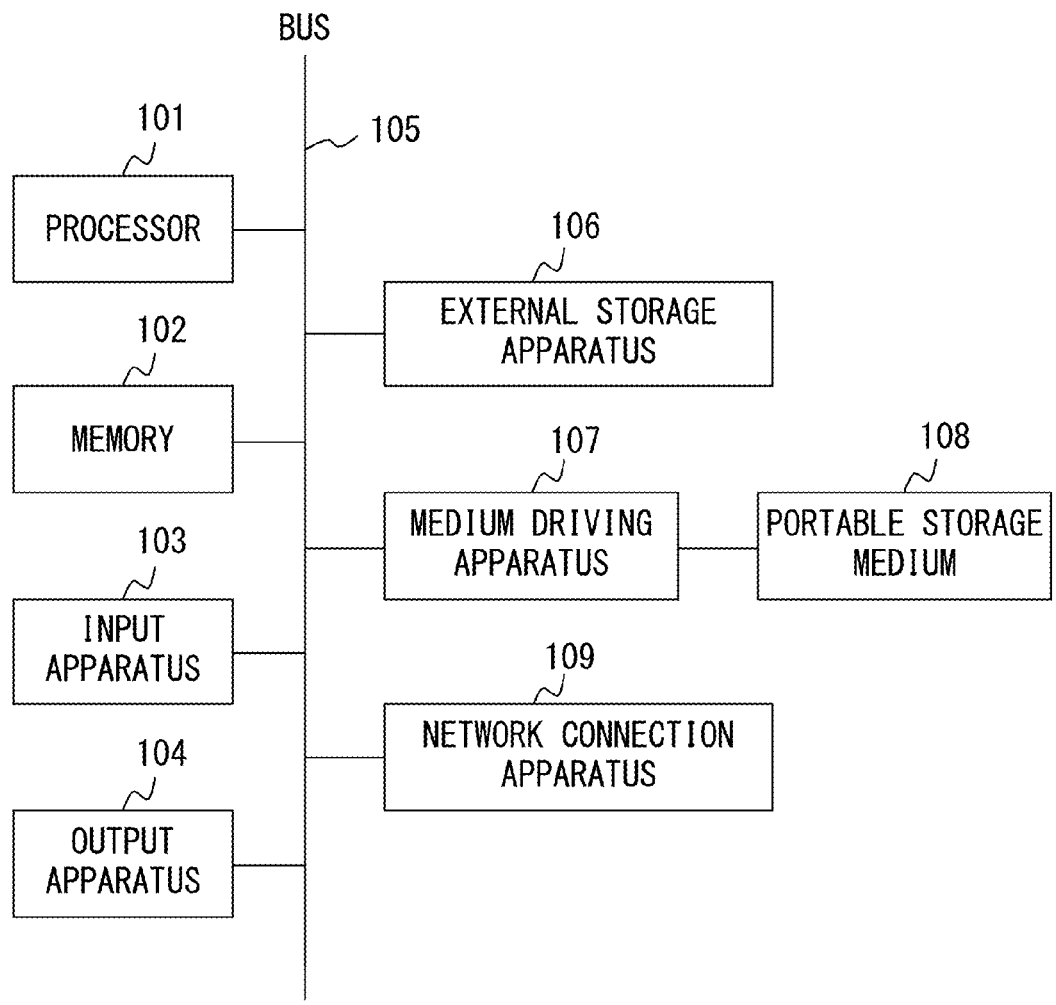
FIG. 4 is a figure representing an example of the hardware configuration of a communication apparatus.

FIG. 4 represents an example of the hardware configuration of the communication apparatus 10. The communication apparatus 10 includes a processor 101, a memory 102, a bus 105, an external storage apparatus 106, a network connection apparatus 109. Further, as options, the communication apparatus 10 may also include an input apparatus 103, an output apparatus 104, a medium driving apparatus 107. The communication apparatus 10 may be realized by a computer or the like in some cases, for example.

The processor 101 may be any processing circuit that includes a Central Processing Unit (CPU). The processor 101 operates as the connection managing unit 14, the cache managing unit 15, the data processing unit 16, and the redundancy detecting unit 20. Meanwhile, the processor 101 is able to execute a program stored in the external storage apparatus 106, for example. The memory 102 operates as the storing unit 30, and in addition to storing the transmitted data table 31, realizes the reception cache 32. Further, the memory 102 also stores data obtained by the operation of the processor 101 and data used for processing of the processor 101, as needed. The network connection apparatus 109 is used for communication with other apparatuses, and operates as the transmitting unit 11, the receiving unit 12, the transmitting/receiving unit 13.

The input apparatus 103 is realized as a button, keyboard, mouse, or the like, for example, and the output apparatus 104 is realized as a display or the like. The bus 105 connects the processor 101, the memory 102, the input apparatus 103, the output apparatus 104, the external storage apparatus 106, the medium driving apparatus 107, the network connection apparatus 109 so that exchange of data with each other may be performed. The external storage apparatus 106 stores a program, data, and like, and provides the stored information to the processor 101 and the like, as needed. The medium driving apparatus 107 is able to output data in the memory 102, the external storage apparatus 106, and the like, to a portable storage medium 108, and is also able to read a program, data, and the like from the portable storage medium 108. Here, the portable storage medium 108 may be any portable storage medium including a floppy disk, a Magneto-Optical (MO) disk, a Compact Disc Recordable (CD-R), a Digital Versatile Disk Recordable (DVD-R), and the like.

First Embodiment

Hereinafter, with an example of a case in which, in the network illustrated in FIG. 2, data are transmitted from an apparatus in the area 4a to an apparatus in the area 4b, an example of processes performed between the communication apparatus 10a and the communication apparatus 10b is explained. Hereinafter, in order to facilitate understanding, a case in which communication between the communication apparatus 10a and the communication apparatus 10b starts by the start of communication between an apparatus in the area 4a and an apparatus in the area 4b is explained as an example. In the example below, the example is a case in which the threshold N is 2 as well, but the value of the threshold N may be set to any value according to the implementation.

In addition, in the explanation below, in order to make it easier to understand by which apparatus an operation is done, the alphabet at the end of the symbols of the communication apparatus 10 is attached after the symbols. For example, the setting unit 23a is the setting unit 23 provided in the communication apparatus 10a, and reception cache 32b is the reception cache 32 provided in the communication apparatus 10b.

(1) The communication apparatus 10a receives data from an apparatus included in the area 4a via the transmitting/receiving unit 13a. The transmitting/receiving unit 13a outputs the received packet to the data processing unit 16a. The data processing unit 16a obtains received data and information of the transmission source, destination, and the like from the input packet, and makes it data addressed to the communication apparatus 10b. The data processing unit 16a outputs the data addressed to the communication apparatus 10b to the dividing unit 21a.

Figure 5:
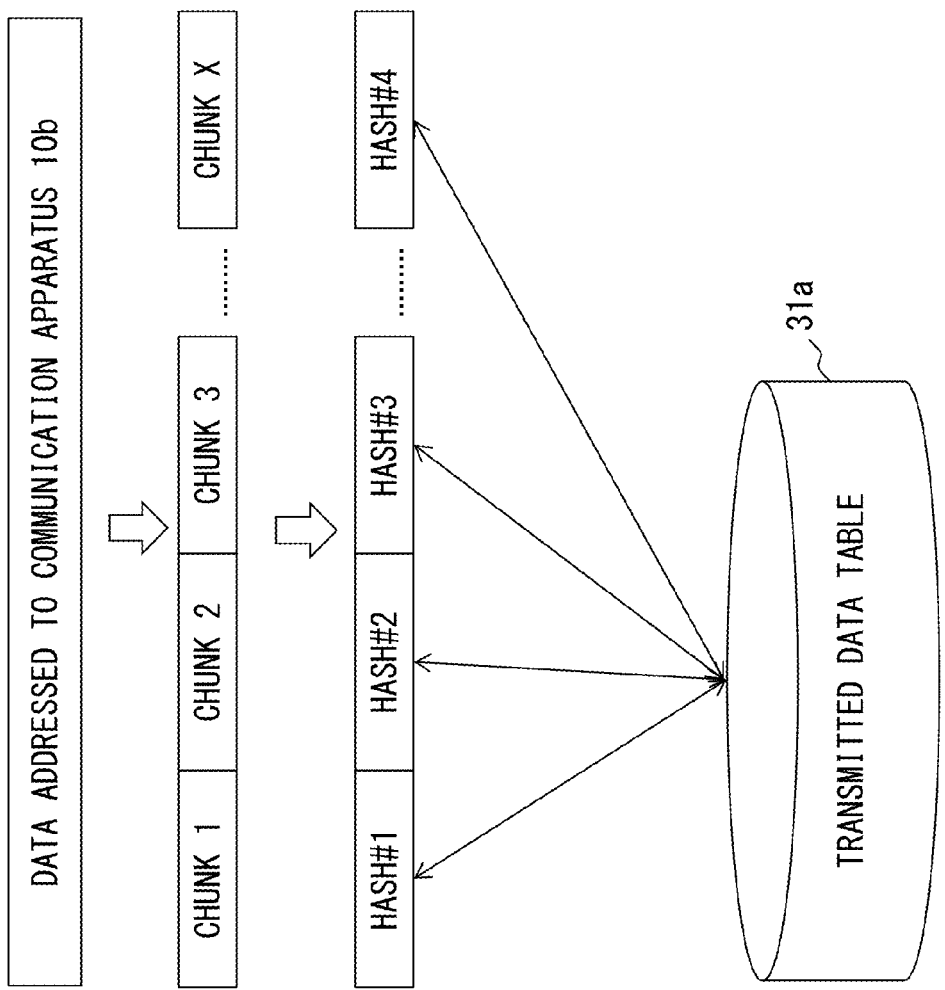
FIG. 5 is a figure explaining an example of processing of a redundancy detecting unit.

FIG. 5 is a figure explaining an example of processing in the redundancy detecting unit 20a. The dividing unit 21a divides input data into chunks of a data length determined in advance. In the example in FIG. 5, the dividing unit 21a divides input data into X pieces of chunks. The dividing unit 21a outputs each individual chunk to the identifier generating unit 22a. Meanwhile, when the size of data that is input to the dividing unit 21a is equal to or smaller than the size of data that is allowed as a chunk, the dividing unit 21a outputs data to the identifier generating unit 22a without dividing.

In the example in FIG. 5, the identifier generating unit 22a generates a hash value using a hash function held in advance, and makes the obtained hash value the identifier of each individual chunk. Meanwhile, the hash function used in the identifier generating unit 22a is supposed to be any function that is able to generate a hash value that is able to uniquely identify each individual chunk. For example, a hash function such as Secure Hash Algorithm-1 (SHA1) or the like may be used in the identifier generating unit 22a in some cases.

(2) The identifier generating unit 22a associates each individual chunk with the hash value, and outputs them to the setting unit 23a. The setting unit 23a performs the search in the transmitted data table 31a, the update process for the transmitted data table 31a, and the like using the hash value.

FIG. 6 represents an example of the transmitted data table 31. The transmitted data table 31 represented in FIG. 6 associates the hash value, the number of transmissions, the index. The hash value is a value generated in the identifier generating unit 22a. The setting unit 23a records the number of transmissions to the communication apparatus 10b, for each chunk identified by the hash value. The index is a value used for identifying the area in which the chunk identified by the hash value is retained in the reception cache 32b held by the communication apparatus 10b. The setting unit 23a calculates the index using the size of the chunk to be transmitted with attachment of a retaining request, and records the obtained value in the transmitted data table 31a.

Figure 7:
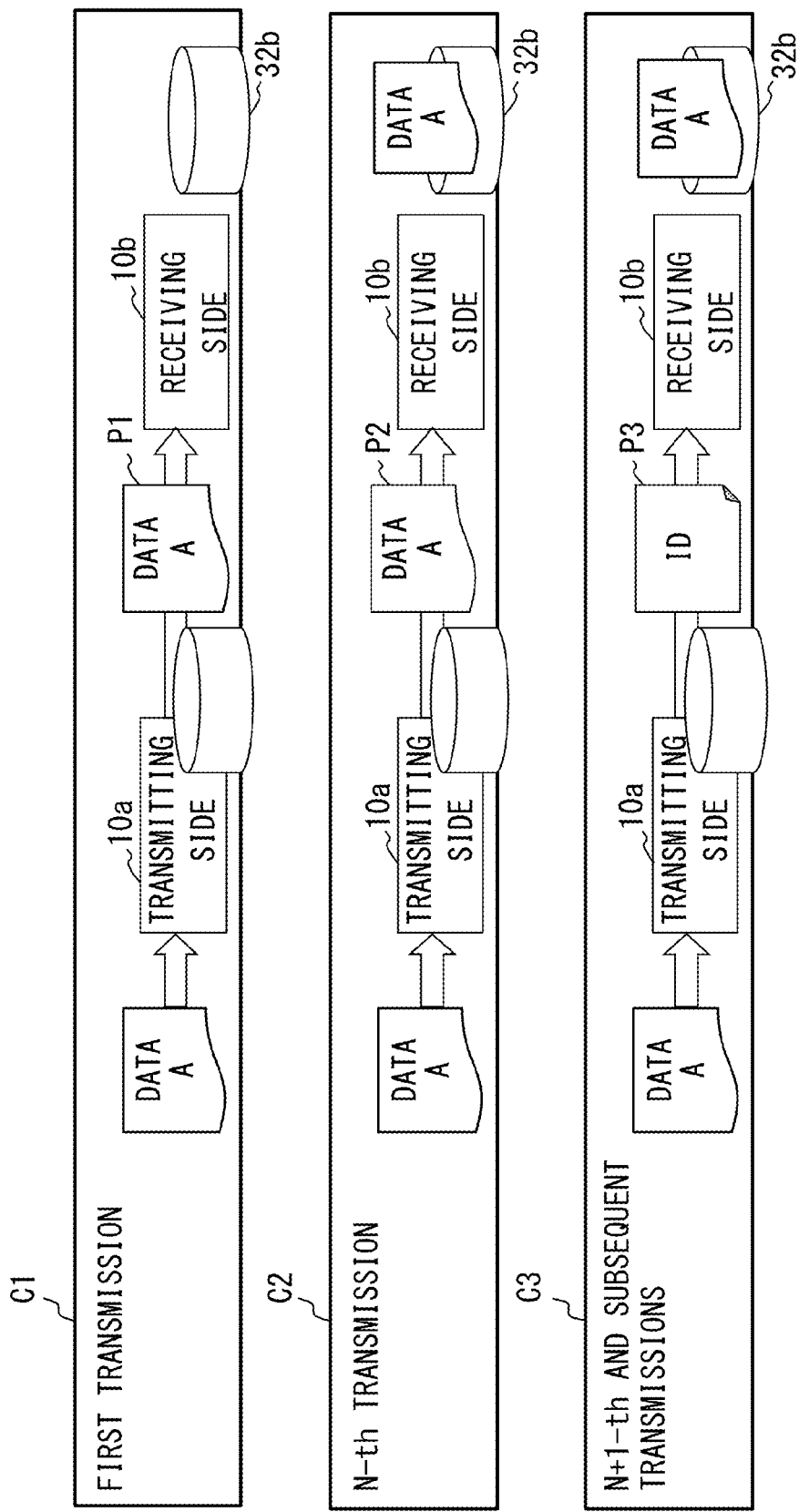
FIG. 7 is a figure explaining an example of a transmission process.

C1 in FIG. 7 represents an example of a transmitting process performed in a case in which a chunk that is data A is input to the setting unit 23a as a Hash1. Meanwhile, in the case in FIG. 7, in order to simplify the figure, an example of a case in which the size of the data A is equal or smaller than the size allowed as a chunk is represented. It is assumed that a hash value Hash1 and data A are input from the identifier generating unit 22a to the setting unit 23a. Data transmission from the communication apparatus 10a to the communication apparatus 10b has not been performed so far, and therefore, the setting unit 23 generates an entry of the chunk of Hash1 in transmitted data table 31a, and sets the number of transmissions of the chunk of Hash1 to 1. At the point in time of generating a new entry, the setting unit 23a sets the value of the index as undetermined. Accordingly, regarding Hash1, data indicated in the first entry of a transmitted data table 31a_1 in FIG. 6 is recorded in the transmitted data table 31a.

After preforming the update process for the entry in the transmitted data table 31a, the setting unit 23a compares the number of transmissions of the chunk of Hash1 and the threshold N. Here, the number of transmissions of Hash1 is 1, and therefore, the number of transmissions is smaller than the threshold N. Then, the setting unit 23a generates a packet P1 addressed to the communication apparatus 10a whose payload is the chunk (data A) of Hash 1, restriction information, information of the final destination of the data A, and the like.

Here, restriction information may be in any format as long as it is information with which it is possible to report that data in the payload is not to be stored in the reception cache 32b to the cache managing unit 15b of the communication apparatus 10b. In the explanation below, explanation is given with an example of a case in which the two bits immediately after the header in the packet are used as a flag used for the cache managing unit 15b to determine whether data in the payload is to be stored in the reception cache 32b. Hereinafter, it is assumed that, in restriction information, the values of the two bits immediately after the header are 00, and in a retaining request, the two bits immediately after the header are 01. The setting unit 23a outputs the generated packet P1 to the transmitting unit 11a. The transmitting unit 11a transmits the packet P1 to the communication apparatus 10b, as presented in C1 in FIG. 7.

(3) Upon receiving the packet P1 transmitted from the communication apparatus 10a, the receiving unit 12b of the communication apparatus 10b outputs the packet P1 to the cache managing unit 15b. The values of the two bits immediately after the header in the packet are 00, and therefore, the cache managing unit 15b determines that data to which restriction information is attached has been received. Then, the cache managing unit 15b extracts data A and information such as the final destination from the packet P1, and outputs them to the data processing unit 16a. At this time, as presented in C1 in FIG. 7, the cache managing unit 15b does not store the extracted data A in the reception cache 32b. The data processing unit 16b generates a packet for transmitting the data A to an apparatus in the area 4b, according to the information obtained from the cache managing unit 15b. The data processing unit 16b transmits the generated packet to the destination apparatus via the transmitting/receiving unit 13b.

(4) It is assumed that, after that, transmission of data from an apparatus in the area 4a to an apparatus in the area 4b is still continued, and a similar process is applied to the transmission target chunk. Along with the transmission process, update of the transmitted data table 31a is also performed. Accordingly, for example, when chunks of Hash1-Hash6 are transmitted respectively once from the communication apparatus 10a to the communication apparatus 10b, the transmitted data table 31a becomes the one presented in the transmitted data table 31a_1 represented in FIG. 6.

(5) It is assumed that, as presented in C2 in FIG. 7, the data A is transmitted again to the communication apparatus 10a. Then, the dividing unit 21a of the communication apparatus 10a outputs the data A to the identifier generating unit 22a, as mentioned in the procedure (1). The identifier generating unit 22a calculates a hash value (Hash1) for the data A using the stored hash function. The identifier generating unit 22a outputs the data A together with the hash value Hash1 to the setting unit 23a.

(6) The setting unit 23a performs a search in the transmitted data table 31a1 (FIG. 6) using the hash value Hash1 input from the identifier generating unit 22a as the key. Then, information of the first entry is hit. Then, the setting unit 23a compares a value after incrementing the number of transmissions by 1 with the threshold N. Here, the value of the number of transmissions associated with Hash1 in the transmitted data table 31a_1 is 1, and by the current processing, the setting unit 23a may transmit the chunk identified by Hash1 to the communication apparatus 10b for the second time. The threshold N is 2, and therefore, the setting unit 23a determines that the value after incrementing the number of transmissions by 1 and the threshold N are equal. Then, the setting unit 23a makes a request to the communication apparatus 10b for retaining the chunk identified by Hash1 in the reception cache 32b.

The setting unit 23a sets the total value of the size of data for which the retaining request has been made to the communication apparatus 10b so far, as the index value of the area in which data of Hash1 is stored in the reception cache 32b of the communication apparatus 10b. Here, it is assumed that there is no data so far that the setting unit 23a transmitted to the communication apparatus 10b with attachment of a retaining request. Then, the setting unit 23a sets the index of Hash1 to 0. Accordingly, by the processing of the data A received by the communication apparatus 10a for the second time, information in the entry for Hash1 in the transmitted data table 31a is updated as presented in the first entry in the transmitted data table 31a_2. At this time, the setting unit 23a stores a value after adding the data length of data for which the retaining request was made to the index of data for which the retaining request was made, as the index for the data to be transmitted next with attachment of an retaining request. For example, when the size of the data of Hash1 is 1000 bytes, the setting unit 23a memorizes that the index value of the data for which the retaining request is to be issued to the communication apparatus 10b next is to be 1000.

Further, in order to make a request to the communication apparatus 10b for retaining the chunk identified by Hash1 in the reception cache 32b, the setting unit 23a generates a packet P2 that includes the data A and a retaining request. The setting unit 23a outputs the generated packet P2 to the transmitting unit 11a. The transmitting unit 11a transmits the packet P2 to the communication apparatus 10b, as presented in C2 in FIG. 7.

(7) The cache managing unit 15b of the communication apparatus 10b obtains the packet P2 via the receiving unit 12b, in a similar manner as in the procedure (3). The values of the two bits immediately after the header in the packet are 01, and therefore, the cache managing unit 15b determines that data to which a retaining request is attached has been obtained. Then, the cache managing unit 15b extracts the data A and information such as the final destination from the packet P2 and outputs them to the data processing unit 16b. Further, as presented in C2 in FIG. 7, the cache managing unit 15b stores the extracted data A in the reception cache 32b. The data processing unit 16b performs processing in a similar manner as in the procedure (3), according to the information obtained from the cache managing unit 15b.

(8) It is assumed that, after that, the communication apparatus 10a receives data B from an apparatus in the area 4a for the second time. Here, it is assumed that the hash value of the data B is Hash2. Upon receiving the data B for the second time, the communication apparatus 10a transmits a retaining request for the data B and the data B to the communication apparatus 10b, using a process similar to the procedures (5), (6), That is, upon obtaining the data of Hash2 for the second time as the transmission target, the setting unit 23a transmits the data of Hash2 to the communication apparatus 10b with attachment of a retaining request. At this time, the setting unit 23a sets the index value of Hash2 to 1000, according to the calculation in the procedure (6). Accordingly, information about Hash2 in the transmitted data table 31a is updated as represented in the second entry in the transmitted data table 31a_2 in FIG. 6. Here, assuming that the data length of the data of Hash2 is 1200 bytes, the setting unit 23a sets the index value for data for which a retaining request is to be issued next to 2200.

Figure 8:
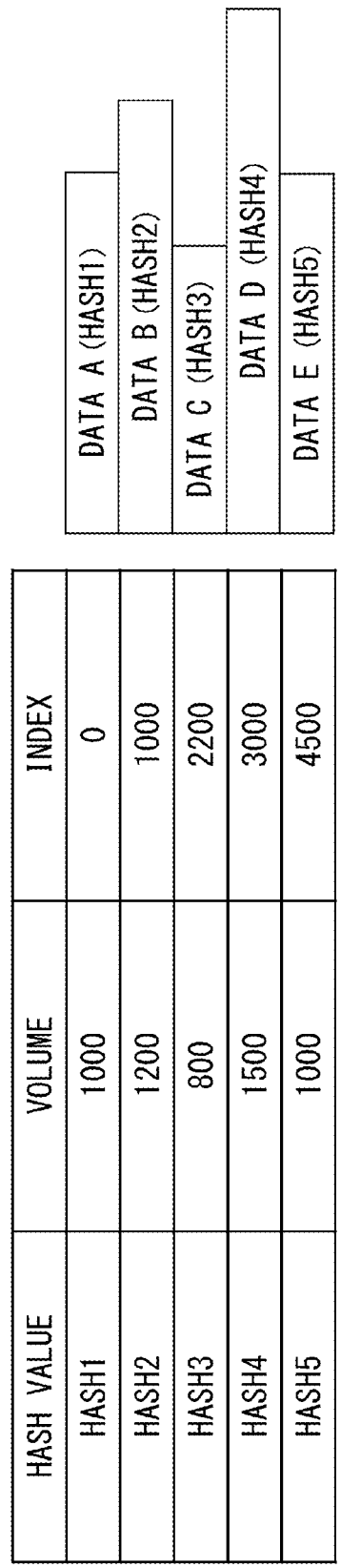
FIG. 8 is a figure representing an example of a method for saving data in a reception cache and an example of a method for determining an index value.

(9) The communication apparatus 10b that received the packet including the chunk of Hash2 performs a process similar to the procedure (7). Accordingly, the chunk of Hash 2 is forwarded to the final destination of the chunk of Hash2, and is also stored in the reception cache 32b. FIG. 8 represents an example of a method for saving data in the reception cache 32b and an example of a method for determining the index value. The table on the left side of FIG. 8 is an example of information held for the cache managing unit 15b to manage the condition of storage of data into the reception cache 32b. The figure on the right side represents an example of storage of data in the reception cache 32b. For each individual chunk stored in the reception cache 32b, the hash value, the volume (data length), the index value for identifying the position of the start of the area in which the chunk is stored are stored.

According to the process described in the procedure (7), the data A identified by Hash1 is retained in the area corresponding to 1000 bytes from the index 0, and therefore, the cache managing unit 15b stores the chunk identified by Hash2 in the area that starts from the index 1000. Here, assuming that the chunk identified by Hash2 is the data B, the chunk of Hash2 is stored in the reception cache 32b in the continuation of the area in which the data A is stored, as presented on the right side of FIG. 8. In addition, the cache managing unit 15b stores the storage condition of the chunk of Hash2 as presented in the second entry in the table on the left side of FIG. 8.

(10) It is assumed that, after that, transmission of data from an apparatus in the area 4a to an apparatus in the area 4b is continued, and the same number of transmissions as the threshold N are performed for the chunks of Hash3-Hash5 as well. Then, the communication apparatus 10a makes request to the communication apparatus 10b for storing each of the chunks of Hash3-Hash5 in the reception cache 32b as well, by performing processes described in the procedures (5), (6), (8), and the like. Meanwhile, when transmission of another chunk (Hash7, Hash8) whose number of transmissions has not reached the threshold N in the intervals of transmissions of the chunks of Hash3-Hash5, the communication apparatus 10a performs a process similar to the procedure (3). Accordingly, at the stage at which the second transmissions of the chunks of Hash3-Hash5 and the first transmissions of the chunks of Hash6-Hash8 are finished, the transmitted data table 31a held by the communication apparatus 10a is as presented in the transmitted data table 31a2 (FIG. 6).

(11) Meanwhile, in the communication apparatus 10b, upon receiving packets including the chunks of Hash3-Hash5, the chunk included in the received packet is stored in the reception cache 32b, as described in the procedure (9). Further, for each of the chunks of Hash3-Hash5, the hash value and the index are associated. Accordingly, by the processing of the chunks of Hash3-Hash5, data are stored in the reception cache 32b as presented on the right side of FIG. 8, and the cache managing unit 15b holds information such as that presented on the left side of the FIG. 8.

(12) It is assumed that, further, the data A is transmitted from an apparatus in the area 4a to the communication apparatus 10a, as illustrated in C3 of FIG. 7. Then, the dividing unit 21a of the communication apparatus 10a outputs the data A to the identifier generating unit 22a, as described in the procedure (1). The identifier generating unit 22a calculates the hash value (Hash1) for data A using the stored hash function. The identifier generating unit 22a outputs the data A to the setting unit 23a, together with the hash value Hash1.

(13) The setting unit 23a performs a search in the transmitted data table 31a_2 (FIG. 6) using the hash value Hash1 input from the identifier generating unit 22a as the key. Then, from the first entry, it is identified that the chunk of Hash1 has already been transmitted twice. Then, the setting unit 23a compares the value after incrementing the number of transmissions by 1 with the threshold N. Here, the chunk identified by Hash1 is to be transmitted to the communication apparatus 10b for the third time, whereas the threshold N is 2, and therefore, the setting unit 23a determines that, for the chunk of Hash1, the number of transmissions exceeds the threshold N. Therefore, the setting unit 23a generates a packet including, instead of the chunk identified by Hash1 in the communication apparatus 10b, a value that identifies the chunk. Here, the value used for the identification of the chunk is any information with which it is possible to uniquely identify the chunk at the communication apparatus 10b. For example, the index value, and the data length of the chunk may be included in the packet as the identifier of the chunk. In this case, the setting unit 23a outputs a packet P3 including, as data, 0 that is the index associated with Hash1, and the data length which is 1000 bytes, to the transmitting unit 11a. At this time, the setting unit 23a is supposed to include, in the packet P3, information that indicates that the transmitted data is information for identifying the chunk. In the explanation below, it is supposed that, as the information that indicates that the transmitted data is information for identifying the chunk, the setting unit 23a sets the values of the two bits immediately after the header in the packet to 11. As illustrated in C3 in FIG. 7, the transmitting unit 11a transmits the packet P3 to the communication apparatus 10b. Meanwhile, the setting unit 23a updates the number of transmissions for the chunk of the Hash1 in the transmitted data table 31a.

(14) The cache managing unit 15b of the communication apparatus 10b obtains the packet P3 via the receiving unit 12b, in a similar manner as in the procedure (3). The values of the two bits immediately after the header in the packet are 11, and therefore, the cache managing unit 15b determines that the index value and the data length associated with a chunk that has already been stored in the reception cache 32b has been reported. Then, the cache managing unit 15b extracts the index value and data length from the packet P3. The cache managing unit 15b obtains information of the extracted data length from the area in the reception cache 32b indicated by the extracted index value, as data received from the communication apparatus 10a. The cache managing unit 15b outputs the obtained data to the data processing unit 16b. The data processing unit 16b performs processing in a similar manner as in the procedure (3), according to the information obtained from the cache managing unit 15b.

Figure 9:
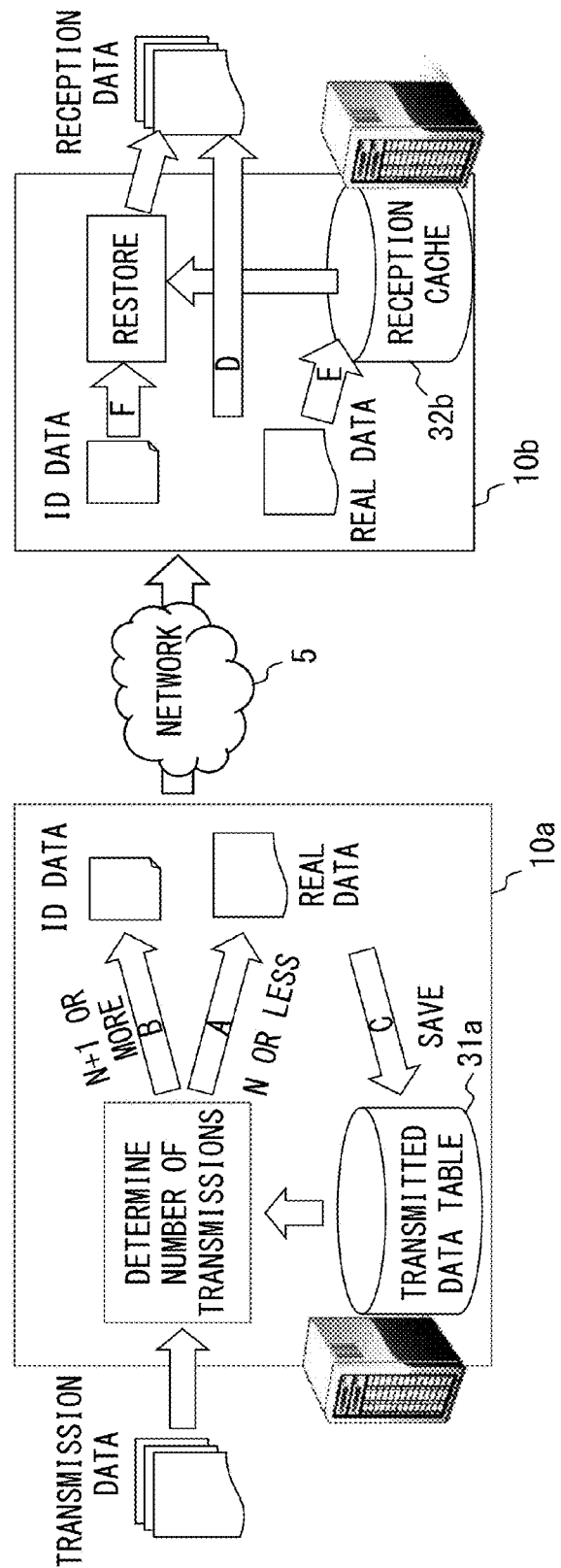
FIG. 9 is a figure explaining an example a communication process.

FIG. 9 is a figure explaining an example of procedures of the communication process. By the execution of the processes explained in the procedures (1)-(14), in the transmission of data from an apparatus in the area 4a to an apparatus in the area 4b, a redundancy removal process is efficiently performed between the communication apparatus 10a and the communication apparatus 10b. That is, upon receiving transmission data to an apparatus in the area 4b from an apparatus in the area 4a, the communication apparatus 10a divides the received data into chunks as needed, and determines the number of transmissions for each individual chunk. At this time, the setting unit 23a in the communication apparatus 10a determines the relationship between the number of transmissions and the threshold, using data in the transmitted data table 31a. For the chunk whose number of transmissions is equal to or smaller than N, as indicated by an arrow A in FIG. 9, the communication apparatus 10a transmits a packet that includes real data to the communication apparatus 10b. At this time, while the number of transmissions is smaller than N, the setting unit 23a restricts the storing of data at the communication apparatus 10b by including restriction information in the packet transmitted to the communication apparatus 10b. Meanwhile, when the number of transmissions reaches N, the setting unit 23a makes the communication apparatus 10b retain the transmitted chunk, by including a retaining request. When the number of transmissions becomes N+1 or more, as indicated by an arrow B in FIG. 9, the setting unit 23a transmits a packet that includes, instead of real data, an identifier (ID data) with which it is possible to uniquely identify the chunk, to the communication apparatus 10b. That is, according to the comparison result of the number of transmissions of the same data with the threshold, the setting unit 23a generates alternative data to be transmitted as an alternative of the transmission target data and makes the generated alternative data the data to be transmitted to the communication apparatus 10 of the receiving side. Further, in the communication apparatus 10a, as indicated by an arrow C, the transmission condition of data is stored in the transmitted data table 31a.

When a packet including restriction information is received, the communication apparatus 10b uses real data of the chunk for the forwarding process, but does not store the received data in the reception cache 32b, as indicated by an arrow D in FIG. 9. When a packet including a retaining request is received, the communication apparatus 10b uses real data of the chunk for the forwarding process, and further stores the read data in the reception cache 32b, as indicated by an arrow E in FIG. 9. When a packet including an identifier of a chunk instead of real data is received, the cache managing unit 15b in the communication apparatus 10b restores data by reading the real data of the chunk identified by the identifier from the reception cache 32b, as indicated by an arrow F in FIG. 9. The communication apparatus 10b uses the restored data for the forwarding process. Meanwhile, the identifier used for the identification of the chunk may be the index value and the data length of the chunk as explained with reference to FIG. 6-FIG. 8, but another information may also be used. For example, the hash value of the chunk may also be used as the identifier.

FIG. 10 is a flowchart explaining an example of processing in the communication apparatus 10 that transmits data. Meanwhile, FIG. 10 is an example, and for example, changes such as switching of the order of determinations in S5 and S7 may be applied. The transmitting/receiving unit 13 of the communication apparatus 10 of the transmitting side obtains transmission data (step S1). When data is input from the transmitting/receiving unit 13, the dividing unit 21 divides the data into chunks of a length equal to or smaller than prescribed length (step S2). The identifier generating unit 22 calculates a hash value for each chunk generated by the dividing unit 21, using a hash function (step S3). The identifier generating unit 22 outputs the hash value and data of the chunk to the setting unit 23. The setting unit 23 identifies, for the input chunk, the number of transmissions to which the current transmission to the same communication apparatus 10 corresponds (step S4). The setting unit 23 determines whether the number of transmissions in the case in which the current transmission is performed is smaller than the threshold (step S5). When the number of transmissions in the case in which the current transmission is performed is smaller than the threshold, the setting unit 23 transmits read data and restriction information to the communication apparatus 10 of the receiving side (Smaller than the threshold in step S5, step S6). When the number of transmissions in the case in which the current transmission is performed is not smaller than the threshold, the setting unit 23 determines whether the number of transmissions in the case in which the current transmission is performed exceeds than the threshold (No in step S5, step S7). When the number of transmissions is equal the threshold, the setting unit 23 transmits real data and a retaining request to the communication apparatus 10 of the receiving side (Equal to the threshold in step S7, step S8). When the number of transmissions exceeds the threshold, the setting unit 23 transmits only the identifier of the chunk, without including real data, to the communication apparatus 10 of the receiving side (Larger than the threshold in step S7, step S9).

FIG. 11 is a flowchart explaining an example of processing in the communication apparatus 10 that receives data. Meanwhile, FIG. 11 is an example, and may be modified so that, for example, in step S23, determining whether a retaining request is included, instead of determining whether restriction information is included. Upon receiving a packet from the communication apparatus 10 of the transmitting side, the receiving unit 12 outputs data to the cache managing unit 15 (step S21). The cache managing unit 15 determines whether real data is included in the packet, by identifying the value of the prescribed area in the packet (step S22). When real data is included in the packet, the cache managing unit 15 determines whether restriction information is included in the packet (Yes in step S22, step S23). When restriction information is not included in the packet, the cache managing unit 15 writes the real data into the reception cache 32, and after that, performs a forwarding process for the real data (No in step S23, step S24, S25). On the other hand, when restriction information is included in the packet, the cache managing unit 15 performs a forwarding process for the real data, without writing the real data into the reception cache 32 (Yes in step S23, step S25). Meanwhile, when real data is not included in the received packet, the cache managing unit 15 obtains the identifier of data from the received packet (No in step S22, step S26). The cache managing unit 15 reads data associated with the obtained identifier from the reception cache 32 (step S27). The cache managing unit 15 outputs the read data to the data processing unit 16. The data processing unit 16 performs a forwarding process for the data input from the cache managing unit 15 (step S28).

As described above, in the method according to the embodiment, while the number of transmissions is smaller than the threshold, transmission data is not stored in the communication apparatus 10 of the receiving side. Accordingly, even when data that are transmitted only a number of times smaller than the threshold are included between data that are transmitted a number of times equal to or larger than the threshold, the communication apparatus 10 of the receiving side may selectively store, in the reception cache 32, data that is likely to be transmitted a number of times equal to or larger than the threshold. Therefore, in the system that uses the communication apparatus 10, forwarding of data including a redundant portion is efficiently prevented.

As a tendency of traffic transmitted and received in a network, a tendency has been reported that data transmitted a large number of times in a redundant manner concentrate on a piece of data (For example, A. Anand, et al., "Redundancy in Network Traffic: Findings and Implications," in SIGMETRICS/Performance 2009, Seattle, Wash. USA). For example, it is assumed that, when redundancy removal is performed using a reception cache that is capable of storing all data that are transmitted once, the volume of data that become the target of transmission may be reduced by A % compared with the case in which redundancy removal is not performed. It has also been reported that the volume that may be reduced in the case in which the target of redundancy removal is only the chunks that are in the top 20% when chunks are arranged, for the same data, in descending order of the number of overlaps is about 0.8×A %. That is, even by reducing the number of data used for redundancy removal to one-fifth, the decrease in the performance of redundancy removal is only about 20%. Therefore, even when the storing into the reception cache 32 is prevented for the first few times by transmitting real data with attachment of restriction information to the communication apparatus 10 of the receiving side as presented in the first embodiment, it may be said that there is little influence on the reduction in the volume of transmitted and received data.

Furthermore, in the method according to the embodiment, data stored in the reception cache 32 are chunks that are transmitted to the communication apparatus of the receiving side at least a number of times equal to the threshold. Accordingly, compared with the case in which all received data are stored in the reception cache, the capacity of the reception cache 32 in the communication apparatus 10 may be reduced.

Meanwhile, in the explanation above, a case in which the communication apparatus 10a is the transmitting side, and the communication apparatus 10b is the receiving side is explained as an example, but either of the communication apparatuses 10 may operate as an apparatus of both the transmitting side and the receiving side. Furthermore, the communication apparatus 10 may perform transmission of data to a plurality of communication apparatuses 10, and may receive data from a plurality of communication apparatuses 10. Accordingly, when communication is performed with a plurality of communication apparatuses 10, the cache managing unit 15 manages information of the reception cache 32 in a separated manner for each combination of the communication apparatus 10 of the transmitting side and the communication apparatus 10 of the receiving side. Therefore, the cache managing unit 15 is able to separately manage data stored in the index 0 that is transmitted from communication apparatus 10a to the communication apparatus 10b, and data stored in the index 0 that is transmitted from the communication apparatus 10c to the communication apparatus 10b. In a similar manner, the setting unit 23 is also supposed to hold a different transmitted data table 31 for each communication apparatus 10 of the destination, and to set information to be included in the transmission packet using the transmitted data table 31 according to the communication apparatus 10 of the receiving side.

Second Embodiment

In the second embodiment, a case in which a communication apparatus 50 changes the threshold N according to the traffic rate is explained. Hereinafter, the volume of data that flows in a network per unit time may be referred to as the "traffic rate". In addition, in the explanation below, the volume of data that flows in a particular path per second is represented by bps (Bits Per Second).

Figure 12:
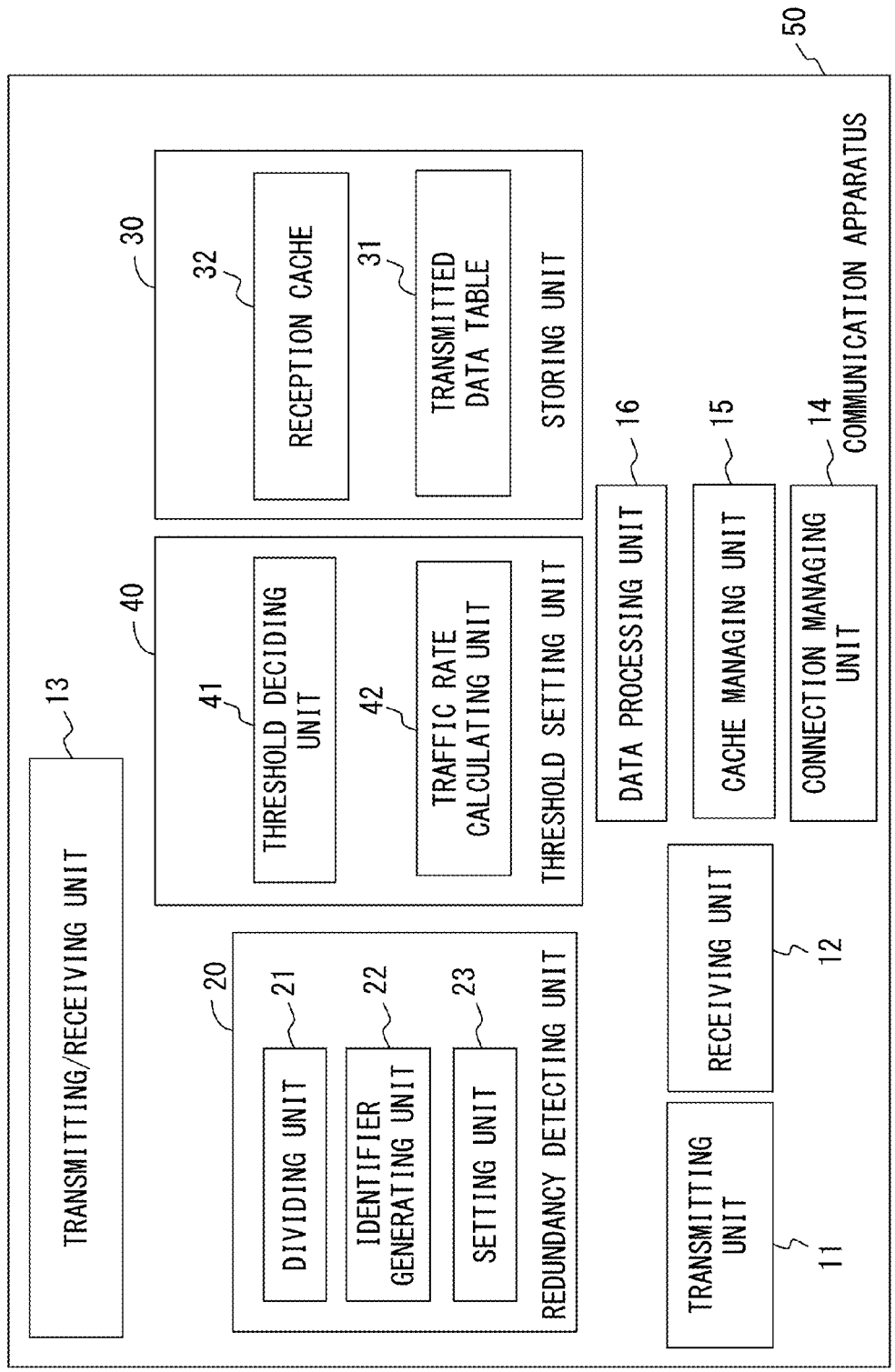
FIG. 12 is a figure representing an example of the configuration of a communication apparatus according to the second embodiment.

FIG. 12 is a figure representing an example of the configuration of the communication apparatus 50 according to the second embodiment. The communication apparatus 50 includes a threshold setting unit 40, and further includes the transmitting unit 11, the receiving unit 12, the transmitting/receiving unit 13, the connection managing unit 14, the cache managing unit 15, the data processing unit 16, the redundancy detecting unit 20, the storing unit 30. The transmitting unit 11, the receiving unit 12, the transmitting/receiving unit 13, the connection managing unit 14, the cache managing unit 15, the data processing unit 16, the redundancy detecting unit 20, the storing unit 30 operate in a similar manner as in the first embodiment.

The threshold setting unit 40 includes a threshold deciding unit 41 and a traffic rate calculating unit 42. The traffic rate calculating unit 42 obtains, from the connection managing unit 14, the number of communication apparatuses 50 with which the communication apparatus 50 itself is communicating as the receiving side, and the identifiers of these communication apparatuses 50. The threshold deciding unit 41 calculates, for each of the communication apparatuses 50 of the transmitting side, the traffic rate of data received from the apparatus. The traffic rate calculating unit 42 outputs the obtained result to the threshold deciding unit 41.

The threshold deciding unit 41 obtains the available capacity of the reception cache 32, and calculates, for each transmission source apparatus, the number of transmissions (threshold N) for the case when data is transmitted with attachment of a retaining request. At this time, the threshold deciding unit 41 determines the threshold N so that, the lower is the traffic rate of received data, the smaller becomes the threshold N used at the apparatus of the transmitting side. Accordingly, the lower is the traffic rate, the smaller becomes the number of times the same data is transmitted and received in a repeated manner, and therefore, it becomes possible to efficiently use the communication path. Meanwhile, when the traffic rate is high, a relatively large threshold N is set, and therefore, the same data may be transmitted and received in a repeated manner in some cases, but data to be stored in the reception cache 32 in the communication apparatus 50 of the receiving side may be limited to data whose number of transmissions is relatively large.

Figure 13:
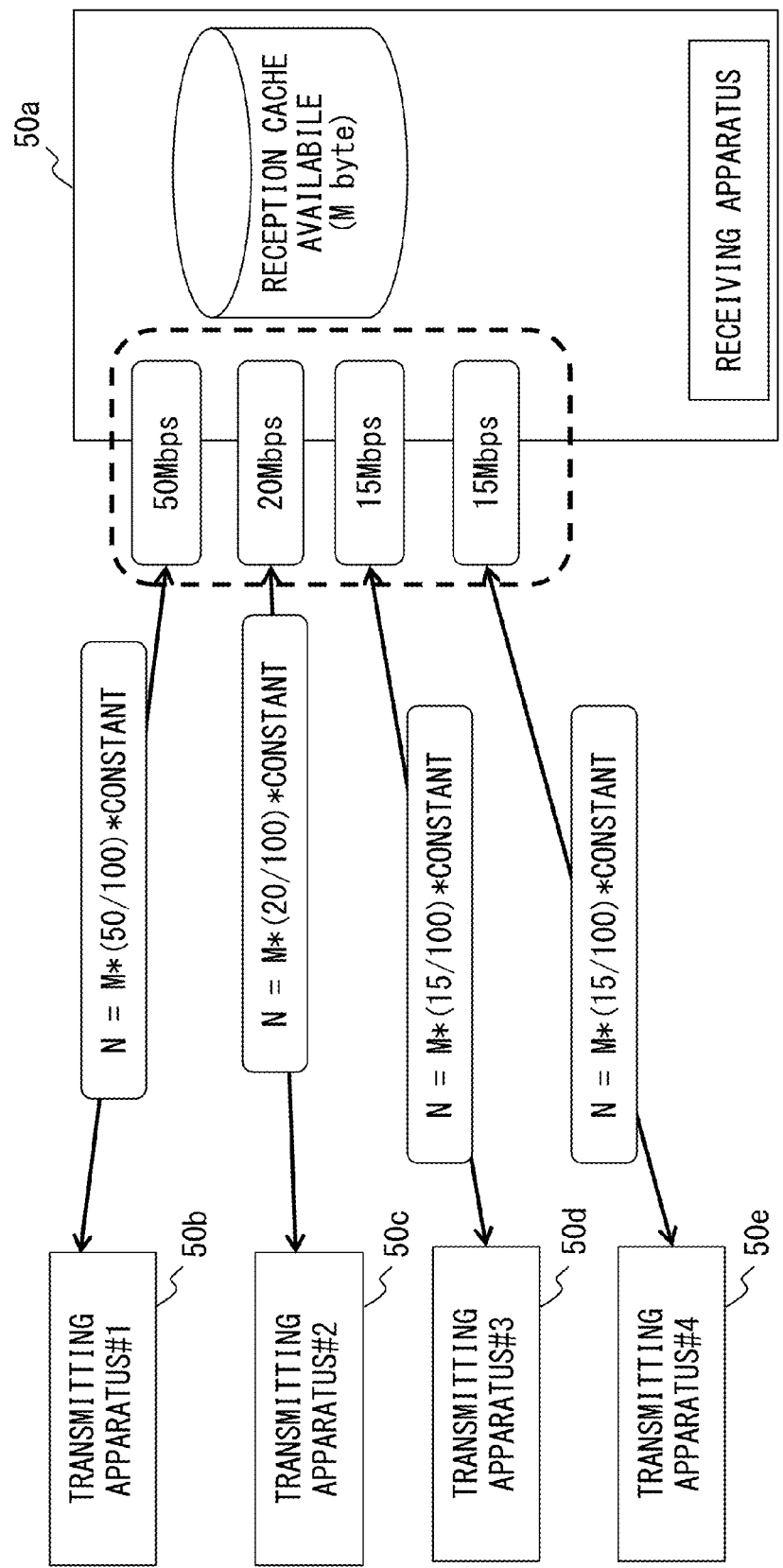
FIG. 13 is a figure explaining an example of a method for deciding a threshold.

FIG. 13 is a figure explaining a method for deciding the threshold. In FIG. 3, explained as an example is a case in which a communication apparatus 50a receives data from communication apparatuses 50b-50e, and the communication apparatus 50a calculates the threshold N used at each of the communication apparatuses 50b-50e. Meanwhile, in FIG. 13, for the sake of convenience, the communication apparatus 50a is referred to as a receiving apparatus, the communication apparatuses 50b-50e are referred to as transmitting apparatuses, so that it is easier to see the threshold is calculated for a case when each of the communication apparatuses 50a-50e is operating as which of the transmitting side and the receiving side.

The connection managing unit 14a in the communication apparatus 50a reports, to the traffic rate calculating unit 42a, that the communication apparatus 50a is communicating as the receiving side with communication apparatuses 50b-50e. The traffic rate calculating unit 42a calculates the traffic rate of data received from each of the communication apparatuses 50b-50e. For example, the traffic rate calculating unit 42a may calculate the traffic rate by counting the number of packets received in a prescribed time, for each of the transmission source apparatuses. In addition, the traffic rate calculating unit 42a may calculate the traffic rate from the time taken to receive a prescribed volume of data, for each of the transmission source apparatuses. In the example in FIG. 13, it is assumed that the traffic rate calculating unit 42a calculated that the communication apparatus 50a is communicating with the communication apparatus 50b at 50 Mbps, with the communication apparatus 50c at 20 Mbps, with the communication apparatuses 50d and 50e at 15 Mbps. The traffic rate calculating unit 42a outputs the value of the traffic rate obtained for each of the communication apparatuses 50 to the threshold deciding unit 41a.

The threshold deciding unit 41a calculates the available capacity of the reception cache 32a. The threshold deciding unit 41a decides the threshold N so as to be directly proportional to the ratio of the traffic rate, so that communication with a low traffic rate may preferentially use the reception cache 32a. That is, the threshold N is determined using the following formula.

$$N = M \times R \times C \qquad (1)$$

Here, M is the available capacity of the reception cache 32a, C is a constant. R is the ratio of the traffic rate with the communication apparatus 50 that is the target for which the threshold N is calculated, in the total value of the traffic rates of data that the communication apparatus 50a are receiving. The multiplier C is set so that the threshold N falls within a range of about 1-20 determined in advance. The threshold deciding unit 41a calculates the threshold N using the same constant C for all the communication apparatuses 50b-50e that are sending data to the communication apparatus 50a. Meanwhile, it is supposed that, when the threshold N obtained by calculation is not an integer, the largest value of an integer that is smaller than the obtained calculation value is set as the threshold N. Meanwhile, when largest value of an integer that is smaller than the obtained calculation value is smaller than 1, the threshold deciding unit 41a sets the threshold N to 1.

For example, assuming that the available capacity of the reception cache 32a is 1M bytes, M in formula (1) is $1 \times 10^9$. Here, it is assumed that the constant C used by the threshold deciding unit 41a is $1 \times 10^{-8}$. For the communication that the communication apparatus 50a is performing with the communication apparatuses 50b-50e, the total value of traffic rates is 50 Mbps+20 Mbps+15 Mbps+15 Mbps=100 Mbps. Then, the ratio R of the traffic rate is 50/100 for the communication apparatus 50b, 20/100 for the communication apparatus 50c, 15/100 for the communication apparatuses 50d and 50e. In this case, the threshold deciding unit 41 calculates the threshold N as follows, according to the formula (1).

$$N(\text{communication apparatus } 50b) = 1 \times 10^9 \times (50/100) \times 1 \times 10^{-8} = 5$$

$$N(\text{communication apparatus } 50c) = 1 \times 10^9 \times (20/100) \times 1 \times 10^{-8} = 2$$

$$N(\text{communication apparatuses } 50d, 50e) = 1 \times 10^9 \times (15/100) \times 1 \times 10^{-8} = 1.5$$

Therefore, the threshold deciding unit 41a sets the threshold N with the communication apparatus 50b to 5, the threshold N with the communication apparatus 50c to 2. Further, for the communication apparatus 50d and the communication apparatus 50e, the threshold N is set to 1, since the calculation value is 1.5.

The threshold deciding unit 41a generates a control packet for reporting the obtained value to the communication apparatus 50 of the transmitting side. In the control packet, a header for specifying the address of the destination, information that indicates that the value of the threshold N is reported, and the obtained threshold N are included. The threshold deciding unit 41a transmits the generated control packet via the transmitting unit 11a to the communication apparatus 50 of the transmission destination.

The receiving unit 12b of the communication apparatus 50b outputs the control packet received from the communication apparatus 50a to the setting unit 23b. The setting unit 23b updates the stored threshold N to a value stored in the control packet. Upon updating the threshold N, thereafter, the setting unit 23b sets data to be transmitted to the communication apparatus 50a using the value after the update. That is, while the number of transmissions is smaller than the newly set threshold N, the setting unit 23b makes real data to which restriction information is attached the target of transmission, and for the transmission of the same number of times as the threshold N, makes real data and retaining information the target of transmission to the communication apparatus 50*a*. Upon receiving a control packet from the communication apparatus 50*a*, the communication apparatus 50*c* through the communication apparatus 50*e* also performs similar processing. Meanwhile, when the number of transmissions of the same data reaches the threshold N, the communication apparatus 50 of the transmitting side transmits data together with a retaining request, and therefore, it may be said that, for the communication apparatus 50 of the transmitting side, the threshold N is an indication of the upper limit value of the number of times the same data may be transmitted without attachment of a retaining request. Accordingly, it may be said that, in the second embodiment, the communication apparatus 50 of the receiving side determines, for the communication apparatus 50 of the transmitting side, an indication of the upper limit value of the number of times the same data may be transmitted without attachment of a retaining request.

Figure 14:
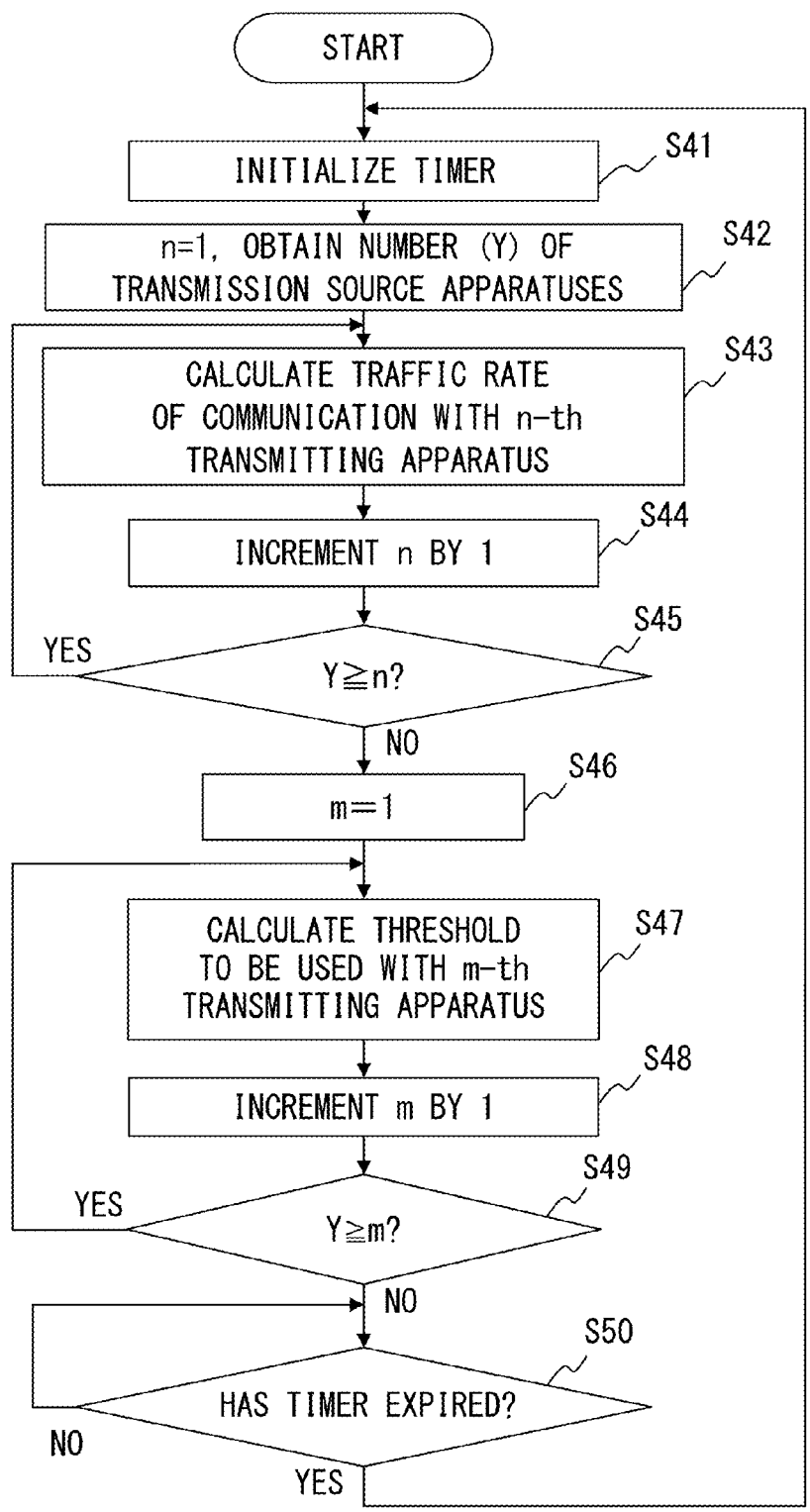
FIG. 14 is a flowchart explaining an example of processing of a communication apparatus that receives data.

FIG. 14 is a flowchart explaining an example of processing of the communication apparatus 50 that receives data. FIG. 14 represents an example of a case in which recalculation of the threshold N is performed in a prescribed cycle. In this case, it is supposed that each of the communication apparatuses 50 holds a timer, and the communication apparatus 50 of the receiving side performs a calculation process for the threshold N in a prescribed cycle. In the example in FIG. 14, variables n, m, a constant Y are used. The constant Y is the number of communication apparatuses 50 that are transmitting data to the communication apparatus 50 calculating the threshold N. The variable n is a variable used for counting the number of paths for which the calculation of the traffic rate have been performed. In addition, the variable m is used for counting the number of communication apparatuses 50 for which the calculation of the threshold N has been performed. Meanwhile, in FIG. 14, in order to make it easier to see the communication apparatus 50 of the transmitting side for data, the communication apparatus 50 of the transmitting side is described as a transmitting apparatus in the flowchart as well, for the sake of convenience.

The traffic rate calculating unit 42 initializes the timer (step S41). The traffic rate calculating unit 42 sets the variable n to 1, and also obtains, from the connection managing unit 14, the number (Y) of the communication apparatuses 50 of the transmission source that are transmitting data to the communication apparatus 50 (step S42). The traffic rate calculating unit 42 calculates the traffic rate of communication with the n-th communication apparatus 50 of the transmitting side (step S43). The traffic rate calculating unit 42 increments n by 1 and determines whether n is equal to or smaller than Y (step S44, S45). When the variable n is equal to or smaller than Y, the traffic rate calculating unit 42 repeats the processes after step S43 (Yes in step S45). On the other hand, when the variable n exceeds Y, the threshold deciding unit 41 sets the variable m to 1 (No in step S45, step S46). The threshold deciding unit 41 calculates the threshold N to be used with the m-th communication apparatus 50 of the transmitting side (step S47). The threshold deciding unit 41 increments the variable m by 1, and determines whether m is equal to or smaller than Y (step S48, S49). When the variable m is equal to or smaller than Y, the threshold deciding unit 41 repeats the processes after step S47 (Yes in step S49). On the other hand, when the variable m exceeds Y, the traffic rate calculating unit 42 determines whether the timer has expired (No in step S49, step S50). When the time has not expired, the traffic rate calculating unit 42 waits until the timer expires (No in step S50). When the timer expires, the traffic rate calculating unit 42 repeats the processes after step S41 (Yes in step S50).

According to the second embodiment, the communication apparatus 50 is able to change the value of the threshold N according to the available capacity of the reception cache 32. Furthermore, the calculation of the threshold N to be used in each of the communication apparatuses 50 of the transmitting side is regularly performed, and therefore, even when there is a variation in the number of the communication apparatuses 50 of the transmitting side that communicate with the communication apparatus 50 of the receiving side, the threshold N may be changed according to the variation. Therefore, the value of the threshold N is autonomously changed according to the condition of the communication performed at the communication apparatus 50, and therefore, a setting for communication that is suitable for the condition is made.

<Others>

Meanwhile, embodiments are not limited to the above-mentioned, and various modifications are possible. Some examples are described below.

The information that is transmitted for the identification of the chunk when the number of transmissions exceeds the threshold is any information with which it is possible to uniquely identify the chunk at the communication apparatus 10 of the receiving side, and may be a hash value, for example. When a hash value is used as the identifier, the setting unit 23 included in the communication apparatus 10 of the transmitting side includes, instead of the chunk, the hash value for the chunk to be transmitted in a packet and transmits it to the communication apparatus 10 of the receiving side. In this case, the communication apparatus 10 of the receiving side performs processing assuming that data associated with the reported hash value has been received.

Even when the index value and the length of the chunk are used as the identifier, it is still possible that the available capacity of the reception cache 32 provided in the communication apparatus 10 of the receiving side will run out. Then, when a chunk is to be deleted due to the running out of the available capacity of the reception cache 32, the communication apparatus 10 of the receiving side reports the chunk to be deleted to the communication apparatus 10 of the transmitting side. According to this process, the index values for the same chunk may be matched between the communication apparatus 10 of the transmitting side and the communication apparatus 10 of the receiving side. Meanwhile, also in the communication between the communication apparatuses 50, when redundant data is reported to the communication apparatus 50 of the receiving side using the index value, a similar process is performed at the communication apparatus 50 of the transmitting side and the communication apparatus 50 of the receiving side.

Information elements and the formats of information stored in the transmitted data table 31 and the reception cache 32 described in the explanation above are merely an example. The information elements and the storage formats or the like of information stored in the transmitted data table 31 and the reception cache 32 may be arbitrarily changed according to the implementation.

In either of the first and second embodiments, a modification may be made so that adjustment is made so that, the smaller is the available area of the reception cache 32 held by the apparatus of the receiving side, the larger becomes the value of the threshold value used when determining whether data including retaining information is to be transmitted. For example, in the case of the second embodiment, when calculating the threshold N, the threshold deciding unit 41 may make the value of the constant C larger when the available capacity of the reception cache 32 is smaller. At this time, it is supposed that the threshold deciding unit 41 stores in advance the relationship between the available capacity of the reception cache 32 and the constant C, and is able to select the constant C according to the available capacity of the reception cache 32 when calculating the threshold N. In the first embodiment, it is supposed that the threshold N set by the setting unit 23 is set so that, the smaller is the available capacity in the reception cache 32, the smaller becomes the threshold N.

In the second embodiment, when the apparatus of the receiving side is the communication apparatus 50, it is possible to perform the changing process for the threshold in a similar manner no matter which of the communication apparatus 50 and the communication apparatus 10 is the apparatus of the transmitting side. Meanwhile, in this case, it is supposed that, for a control packet received from the communication apparatus 50 of the receiving side of data, the communication apparatus 10 also performs similar processing as that of the communication apparatus 50 of the transmitting side.

All examples and conditional language provided herein are intended for the pedagogical purposes of aiding the reader in understanding the invention and the concepts contributed by the inventor to further the art, and are not to be construed as limitation to such specifically recited examples and conditions, nor does the organization of such examples in the specification relate to a showing of the superiority and inferiority of the invention. Although one or more embodiments of the present invention have been described in detail, it should be understood that the various changes, substitutions, and alternations could be made hereto without departing from the spirit and scope of the invention.

What is claimed is:

1. A communication apparatus comprising:
    a memory configured to store a number of transmissions of data to a destination of the data in association with an identifier that identifies the data;
    a processor configured to set, when a number of transmissions of target data that is data of a target of transmission to the destination reaches a threshold, a combination of the target data and a retaining request for requesting retaining of the target data as alternative data to be transmitted to the destination as an alternative of the target data, and to set, after transmission of the retaining request for the target data, an identifier of the target data as the alternative data; and
    a transmitter configured to transmit the alternative data to the destination.

2. The communication apparatus according to claim 1, wherein
    while the number of transmissions of the target data is smaller than the threshold, the processor sets a combination of the target data and information for restricting retaining of the target data as the alternative data.

3. The communication apparatus according to claim 1, comprising:
    a receiver configured to receive data transmitted to the communication apparatus;
    a reception cache configured to retain data to which the retaining request is attached among received data; wherein
    the processor
        calculates a traffic rate of data received from a transmission source that is an apparatus transmitting data to the communication apparatus, and
        decides an indication value used by the transmission source as an indication of an upper limit value of a number of times identical data may be transmitted to the communication apparatus before the transmission source attaches the retaining request so as to become a smaller value for a lower traffic rate, and
    the transmitter transmits a packet including the indication value to the transmission source.

4. A communication method in a network including a first communication apparatus and a second communication apparatus, the communication method comprising:
    generating, by the first communication apparatus, an identifier that identifies data transmitted to the second communication apparatus;
    setting, by the first communication apparatus, when a number of transmissions of target data that is data of a target of transmission to the second communication apparatus reaches a threshold, a combination of the target data and a retaining request for requesting retaining of the target data as alternative data to be transmitted to the second communication apparatus as an alternative of the target data;
    retaining, by the second communication apparatus, the target data received together with the retaining request in a reception cache held by the second communication apparatus;
    setting, by the first communication apparatus, after transmission of the retaining request, the identifier of the target data as the alternative data; and
    handling, by the second communication apparatus, upon receiving the identifier, data associated with the identifier as data received from the first communication apparatus.

5. The communication method according to claim 4, wherein
    while the number of transmissions of the target data to the second communication apparatus is smaller than the threshold, the first communication apparatus sets a combination of the target data and information for restricting retaining of the target data as the alternative data; and
    the second communication apparatus does not store target data received together with the restriction information in the reception cache, when processing the target data as received data from the first communication apparatus.

6. The communication method according to claim 4, wherein
    the second communication apparatus
        calculates a traffic rate of data received from the first communication apparatus;
        decides a value of the threshold as a smaller value for the lower traffic rate;
        reports a value determined as the threshold to the first communication apparatus; and
    the first communication apparatus determines whether data is to be transmitted to the second communication apparatus with attachment of the retaining request, using the value reported from the second communication apparatus as the threshold.

7. The communication method according to claim 4, wherein the first communication apparatus determines, using a first threshold, whether the retaining request is to be included in data transmitted to the second communication apparatus;

a third communication apparatus determines, using a second threshold, whether the retaining request is to be included in data transmitted to the second communication apparatus;

the second communication apparatus calculates a first rate that is a traffic rate of data received from the first communication apparatus, and a second rate that is a traffic rate of data received from the third communication apparatus;

decides, when the second rate is higher than the first rate, update values for the first and second thresholds so that a value of the second threshold becomes larger than the first threshold value;

the first communication apparatus determines, using the update value for the first threshold reported from the second communication apparatus, whether the retaining request is to be included in data transmitted to the second communication apparatus; and the third communication apparatus determines, using the update value for the second threshold reported from the second communication apparatus, whether the retaining request is to be included in data transmitted to the second communication apparatus.

8. A non-transitory computer-readable recording medium having stored therein a communication program for causing a communication apparatus to execute a process comprising:

storing a number of transmissions of data to a destination of the data in association with an identifier that identifies the data;

setting, when a number of transmissions of target data that is data of a target of transmission to the destination reaches a threshold, a combination of the target data and a retaining request for requesting retaining of the target data as alternative data to be transmitted to the destination as an alternative of the target data, setting, after transmission of the retaining request for the target data, the identifier of the target as the alternative data; and transmitting the alternative data to the destination.

9. The non-transitory computer-readable recording medium according to claim 8 wherein, the communication program causes the communication apparatus to execute a process comprising setting, while the number of transmissions of the target data is smaller than the threshold, a combination of the target data and information for restricting retaining of the target data as the alternative data.

10. The non-transitory computer-readable recording medium according to claim 8, wherein, the communication program causes the communication apparatus to execute a process comprising:

receiving data transmitted to the communication apparatus;

calculating a traffic rate of data received from a transmission source that is an apparatus transmitting data to the communication apparatus; and deciding an indication value used by the transmission source as an indication of an upper limit value of a number of times identical data may be transmitted to the communication apparatus before the transmission source attaches the retaining request so as become a smaller value for a lower traffic rate; and transmitting a packet including the indication value to the transmission source.

* * * * *